United States Patent
Kovarik et al.

(10) Patent No.: US 12,248,839 B2
(45) Date of Patent: Mar. 11, 2025

(54) DRIVING ASSISTANCE METHOD AND SYSTEM

(71) Applicants: Joseph E. Kovarik, Englewood, CO (US); James J. Kovarik, Englewood, CO (US)

(72) Inventors: Joseph E. Kovarik, Englewood, CO (US); James J. Kovarik, Englewood, CO (US)

(*) Notice: Subject to any disclaimer, the term of this patent is extended or adjusted under 35 U.S.C. 154(b) by 0 days.

(21) Appl. No.: 18/420,322

(22) Filed: Jan. 23, 2024

(65) Prior Publication Data

US 2024/0160871 A1 May 16, 2024

Related U.S. Application Data

(63) Continuation of application No. 18/100,044, filed on Jan. 23, 2023, now Pat. No. 11,966,808, which is a
(Continued)

(51) Int. Cl.
*G06K 7/10* (2006.01)
*E01F 9/30* (2016.01)
(Continued)

(52) U.S. Cl.
CPC ............ *G06K 7/10376* (2013.01); *E01F 9/30* (2016.02); *E01F 9/578* (2016.02); *G05D 1/0259* (2013.01); *G05D 1/243* (2024.01)

(58) Field of Classification Search
CPC ....... G06K 7/10376; E01C 9/00; E01C 11/00; E01F 11/00; E01F 9/005; E01F 9/30;
(Continued)

(56) References Cited

U.S. PATENT DOCUMENTS

| | | |
|---|---|---|
| 3,609,678 A | 9/1971 | Fayling |
| 3,725,930 A | 4/1973 | Caruso, Jr. |

(Continued)

FOREIGN PATENT DOCUMENTS

| | | |
|---|---|---|
| WO | WO 96/16231 | 5/1996 |
| WO | WO 99/04097 | 1/1999 |

(Continued)

OTHER PUBLICATIONS

"High Intensity Prismatic Reflective Sheeting Series 3930," 3M, Product Bulletin 3939, 2013, 8 pages.

*Primary Examiner* — Thomas D Alunkal
(74) *Attorney, Agent, or Firm* — Sheridan Ross P.C.

(57) ABSTRACT

A driving assistance system and method is provided that includes a plurality of magnetic markers having a magnet component configured to generate a magnetic field on a road surface, together with a pavement marking material that includes a RFID tag that is readable by a RFID tag reader. The pavement marking material includes encoded information that is conveyed to a vehicle's on-board sensing system that is adapted to obtain data through wireless communications. The magnetic markers are conformable, polymeric materials having viscoelastic properties such that vehicles having magnetic sensors can detect magnetic fields from the magnetic markers when positioned on a road surface.

20 Claims, 7 Drawing Sheets

Related U.S. Application Data continuation of application No. 17/503,579, filed on Oct. 18, 2021, now Pat. No. 11,568,159, which is a continuation of application No. 17/104,147, filed on Nov. 25, 2020, now Pat. No. 11,151,339, which is a continuation-in-part of application No. 16/131,127, filed on Sep. 14, 2018, now Pat. No. 10,867,139, which is a continuation of application No. 15/883,223, filed on Jan. 30, 2018, now Pat. No. 10,078,770, which is a continuation of application No. 14/938,352, filed on Nov. 11, 2015, now Pat. No. 9,892,296.

(60) Provisional application No. 62/163,163, filed on May 18, 2015, provisional application No. 62/078,539, filed on Nov. 12, 2014.

(51) Int. Cl.
*E01F 9/576* (2016.01)
*G05D 1/00* (2006.01)
*G05D 1/243* (2024.01)

(58) Field of Classification Search
CPC ....... E01F 9/578; G01S 19/13; G05D 1/0259; G05D 2201/0213
See application file for complete search history.

(56) References Cited

U.S. PATENT DOCUMENTS

| | | |
|---|---|---|
| 4,490,432 A | 12/1984 | Jordan |
| 4,588,258 A | 5/1986 | Hoopman |
| 4,947,094 A | 8/1990 | Dyer et al. |
| 5,202,742 A | 4/1993 | Frank et al. |
| 5,347,456 A | 9/1994 | Zhang et al. |
| 5,853,846 A | 12/1998 | Clark |
| 6,051,297 A | 4/2000 | Maier et al. |
| 6,217,252 B1 | 4/2001 | Tolliver et al. |
| 6,236,915 B1 | 5/2001 | Furukawa et al. |
| 6,289,269 B1* | 9/2001 | Seiferling ............ G05D 1/0263 180/167 |
| 6,289,299 B1 | 9/2001 | Seiferling |
| 6,291,901 B1 | 9/2001 | Cefo |
| 6,335,689 B1 | 1/2002 | Mine |
| 6,414,606 B1 | 7/2002 | Yujiri et al. |
| 6,417,785 B1 | 7/2002 | Tyburski |
| 6,600,418 B2 | 7/2003 | Francis |
| 6,614,469 B1 | 9/2003 | Kato et al. |
| 6,772,062 B2* | 8/2004 | Lasky ................. G05D 1/0261 701/518 |
| 6,807,853 B2 | 10/2004 | Adamson et al. |
| 7,084,773 B2 | 8/2006 | Oyama |
| 7,138,750 B2 | 11/2006 | Mancosu et al. |
| 7,140,803 B2 | 11/2006 | Cummings et al. |
| 7,451,027 B2 | 11/2008 | Pereri et al. |
| 7,680,569 B2 | 3/2010 | Matsumoto et al. |
| 7,791,503 B2 | 9/2010 | Breed et al. |
| 7,832,263 B2 | 11/2010 | Rensel et al. |
| 7,983,802 B2 | 7/2011 | Breed |
| 8,111,147 B2 | 2/2012 | Litkouhi |
| 8,178,002 B2 | 5/2012 | Carmardello et al. |
| 8,290,659 B2 | 10/2012 | Asano |
| 8,352,110 B1 | 1/2013 | Szybalski et al. |
| 8,352,112 B2 | 1/2013 | Mudalige |
| 8,378,799 B2 | 2/2013 | Yim et al. |
| 8,451,140 B2 | 5/2013 | Piccinini et al. |
| 8,456,327 B2 | 6/2013 | Bechtel et al. |
| 8,462,988 B2 | 6/2013 | Boon |
| 8,489,648 B1 | 7/2013 | Rubin |
| 8,494,716 B1 | 7/2013 | Lee et al. |
| 8,520,954 B2 | 8/2013 | Suzuki |
| 8,527,199 B1 | 9/2013 | Burnette et al. |
| 8,532,862 B2 | 9/2013 | Neff |
| 8,717,156 B2 | 5/2014 | Tronnier et al. |
| 8,775,060 B2 | 7/2014 | Solyom et al. |
| 8,781,669 B1 | 7/2014 | Teller et al. |
| 8,818,608 B2 | 8/2014 | Cullinane et al. |
| 8,841,785 B2 | 9/2014 | Theuss et al. |
| 8,874,301 B1 | 10/2014 | Rao et al. |
| 8,880,273 B1 | 11/2014 | Chatham |
| 8,954,261 B2 | 2/2015 | Das et al. |
| 8,977,420 B2 | 3/2015 | Deng et al. |
| 8,989,943 B2 | 3/2015 | You |
| 9,081,385 B1 | 7/2015 | Ferguson et al. |
| 9,090,259 B2 | 7/2015 | Dolgov et al. |
| 9,090,264 B1 | 7/2015 | Zhao et al. |
| 9,096,267 B2 | 8/2015 | Mudalige et al. |
| 9,129,272 B2 | 9/2015 | Penilla et al. |
| 9,235,211 B2 | 1/2016 | Davidsson et al. |
| 9,268,332 B2 | 2/2016 | Montemerlo et al. |
| 9,273,972 B2 | 3/2016 | Narasimha et al. |
| 9,275,544 B2 | 3/2016 | Levine et al. |
| 9,278,691 B1 | 3/2016 | Zsormbory |
| 9,351,111 B1 | 4/2016 | McGrath |
| 9,475,496 B2 | 10/2016 | Attard et al. |
| 9,547,989 B2 | 1/2017 | Fairfield et al. |
| 9,594,373 B2 | 3/2017 | Solyom et al. |
| 9,701,846 B2 | 7/2017 | Protzmann et al. |
| 9,834,207 B2 | 12/2017 | O'Dea et al. |
| 9,892,296 B2* | 2/2018 | Kovarik ................. G01S 13/878 |
| 10,078,770 B2* | 9/2018 | Kovarik ............. G06K 7/10376 |
| 10,612,199 B2 | 4/2020 | Pratt et al. |
| 10,823,844 B2 | 11/2020 | Amdt et al. |
| 10,867,127 B2 | 12/2020 | Kovarik et al. |
| 11,151,339 B2 | 10/2021 | Kovarik et al. |
| 11,568,159 B2 | 1/2023 | Kovarik et al. |
| 2002/0174084 A1 | 11/2002 | Mitsugi |
| 2003/0009270 A1* | 1/2003 | Breed .................. B60N 2/0276 701/32.4 |
| 2003/0123930 A1 | 7/2003 | Jacobs et al. |
| 2005/0060069 A1* | 3/2005 | Breed .................. B60W 40/06 701/408 |
| 2005/0286972 A1 | 12/2005 | Gongolas |
| 2006/0033641 A1 | 2/2006 | Jaupitre et al. |
| 2007/0021915 A1 | 1/2007 | Breed et al. |
| 2007/0116865 A1 | 5/2007 | Lichtblau |
| 2007/0152845 A1 | 7/2007 | Porte et al. |
| 2007/0225913 A1 | 9/2007 | Ikeda et al. |
| 2008/0074273 A1 | 3/2008 | Endo |
| 2008/0085686 A1* | 4/2008 | Kalik ..................... G01S 13/931 455/154.1 |
| 2008/0228400 A1* | 9/2008 | Wheeler ................. G08G 1/02 701/301 |
| 2009/0125174 A1* | 5/2009 | Delean ................. G05D 1/0291 701/469 |
| 2009/0143923 A1 | 6/2009 | Breed |
| 2009/0195124 A1 | 8/2009 | Abramovich et al. |
| 2011/0159174 A1 | 6/2011 | Paul |
| 2011/0215947 A1 | 9/2011 | Ekmark et al. |
| 2011/0320163 A1 | 12/2011 | Markkula et al. |
| 2012/0098657 A1* | 4/2012 | Bogatine ............... G05D 1/0261 340/439 |
| 2012/0149000 A1 | 6/2012 | Baker et al. |
| 2012/0203418 A1 | 8/2012 | Branennstroem et al. |
| 2012/0206098 A1 | 8/2012 | Kim |
| 2012/0265403 A1 | 10/2012 | Svensson et al. |
| 2013/0184926 A1 | 7/2013 | Spero et al. |
| 2013/0218397 A1 | 8/2013 | Griffini et al. |
| 2013/0222114 A1* | 8/2013 | Smith ................. G06K 7/10425 29/428 |
| 2013/0231820 A1 | 9/2013 | Solyom et al. |
| 2013/0231829 A1 | 9/2013 | Gerdt |
| 2013/0271074 A1 | 10/2013 | Federico |
| 2013/0339108 A1 | 12/2013 | Ryder |
| 2014/0012431 A1 | 1/2014 | Breed |
| 2014/0035526 A1 | 2/2014 | Tripathi |
| 2014/0104051 A1* | 4/2014 | Breed ................. G08G 1/09626 340/435 |
| 2014/0121964 A1 | 5/2014 | Stanley et al. |
| 2014/0195093 A1 | 7/2014 | Litkouhi et al. |
| 2014/0207377 A1 | 7/2014 | Gupta et al. |
| 2014/0225694 A1 | 8/2014 | Sitti et al. |
| 2014/0236463 A1 | 8/2014 | Zhang et al. |

(56) References Cited

U.S. PATENT DOCUMENTS

| | | |
|---|---|---|
| 2014/0249735 A1 | 9/2014 | Levine et al. |
| 2014/0267728 A1* | 9/2014 | Dahlin ............... G06K 7/10366 |
| | | 348/148 |
| 2014/0297094 A1 | 10/2014 | Dolgov et al. |
| 2014/0297116 A1 | 10/2014 | Anderson et al. |
| 2014/0307247 A1 | 10/2014 | Zhu et al. |
| 2015/0100189 A1 | 4/2015 | Tellis et al. |
| 2015/0166069 A1 | 6/2015 | Engelman et al. |
| 2015/0198951 A1 | 7/2015 | Thor et al. |
| 2015/0210274 A1 | 7/2015 | Clark et al. |
| 2015/0241880 A1 | 8/2015 | Kim et al. |
| 2015/0266477 A1 | 9/2015 | Schmudderich |
| 2016/0005243 A1 | 1/2016 | Giraud |
| 2016/0043565 A1 | 2/2016 | Asaoka |
| 2017/0305273 A1 | 10/2017 | Korenaga et al. |
| 2018/0122245 A1 | 5/2018 | Penilla |
| 2018/0166915 A1 | 6/2018 | Afridi |
| 2018/0238698 A1 | 8/2018 | Pedersen |
| 2018/0321685 A1 | 11/2018 | Yalla |
| 2019/0016384 A1 | 1/2019 | Carlson |
| 2019/0108698 A1 | 4/2019 | Outwater et al. |
| 2019/0176633 A1 | 6/2019 | Booth |
| 2019/0184841 A1 | 6/2019 | Van Wiemeersch et al. |
| 2019/0250269 A1 | 8/2019 | Miu |
| 2019/0389314 A1 | 12/2019 | Zhu |
| 2020/0005564 A1 | 1/2020 | Coburn |
| 2020/0139830 A1 | 5/2020 | Eakins et al. |
| 2020/0180448 A1 | 6/2020 | Boecker |
| 2020/0219391 A1 | 7/2020 | Smith et al. |
| 2020/0251929 A1 | 8/2020 | Partovi |
| 2020/0280216 A1 | 9/2020 | Pei |
| 2020/0285246 A1 | 9/2020 | Rakshit et al. |
| 2020/0298722 A1 | 9/2020 | Smolenaers |
| 2020/0307403 A1 | 10/2020 | Rastoll et al. |
| 2020/0350775 A1 | 11/2020 | Penilla et al. |
| 2023/0153554 A1 | 5/2023 | Kovarik et al. |

FOREIGN PATENT DOCUMENTS

| | | |
|---|---|---|
| WO | WO 99/04099 | 1/1999 |
| WO | WO 2003/0033330 | 4/2003 |
| WO | WO 2013/018038 | 2/2013 |
| WO | WO 2013/160238 | 10/2013 |
| WO | WO 2014/082821 | 6/2014 |
| WO | WO 2014/130178 | 8/2014 |

* cited by examiner

DRIVING ASSISTANCE METHOD AND SYSTEM

RELATED APPLICATION

This application is continuation of U.S. patent application Ser. No. 18/100,044, filed Jan. 23, 2023, which is a continuation of U.S. patent application Ser. No. 17/503,579, filed Oct. 18, 2021 (now U.S. Pat. No. 11,568,159, issued Jan. 31, 2023), which is a continuation of U.S. patent application Ser. No. 17/104,147, filed Nov. 25, 2020 (now U.S. Pat. No. 11,151,339, issued Oct. 19, 2021), which is a continuation in part of U.S. patent application Ser. No. 16/131,127, filed on Sep. 14, 2018 (now U.S. Pat. No. 10,867,139, issuing Dec. 15, 2020), which is a continuation of U.S. patent application Ser. No. 15/883,223, filed Jan. 30, 2018 (now U.S. Pat. No. 10,078,770, issued Sep. 18, 2018), which is a continuation of U.S. patent application Ser. No. 14/938,352, filed Nov. 11, 2015 (now U.S. Pat. No. 9,892,296, issued Feb. 13, 2018), which seeks priority from U.S. Provisional Patent Application No. 62/078,539, filed on Nov. 12, 2014, and U.S. Provisional Patent Application No. 62/163,163, filed on May 18, 2015. The entire disclosure of the prior applications is considered to be part of the disclosure of the accompanying application and is hereby incorporated by reference.

FIELD OF THE INVENTION

Conductive AC and DC charging, connection, communication and safety used in equipment that provides electric charging in and to electric vehicles, especially in autonomous vehicles, provides for a cost effective, reliable, redundant system and method for electric vehicles that are guided by specialized lane marking components that permit unprecedented sensor feedback, and enables accurate lane marking recognition despite adverse weather conditions. The present invention enables electric vehicles to locate a charging station in a network of charge dispensing kiosks via mobile applications for obtaining information about available charging dispensing kiosks.

BACKGROUND OF THE INVENTION

Electric vehicles have been utilized for transportation purposes and recreational purposes for quite some time. Electric vehicles require a battery that powers an electric motor, and in turn propels the vehicle in the desired location. The drawback with electric vehicles is that the range provided by batteries is limited, and the infrastructure available to users of electric vehicles is substantially reduced compared to fossil fuel vehicles. For instance, fossil fuel vehicles that utilize gasoline and diesel to operate piston driven motors represent a majority of all vehicles utilized by people around the world. Consequently, fueling stations are commonplace and well distributed throughout areas of transportation, providing for easy refueling at any time. For this reason, fossil fuel vehicles are generally considered to have unlimited range, provided users refuel before their vehicles reach empty.

On the other hand, owners of electric vehicles must carefully plan their driving routes and trips around available recharging stations. For this reason, many electric vehicles on the road today are partially electric and partially fossil fuel burning. For those vehicles that are pure electric, owners usually rely on charging stations at their private residences, or specialty recharging stations. However, specialty recharging stations are significantly few compared to fossil fuel stations. In fact, the scarcity of recharging stations in and around populated areas has caused owners of electric vehicles to coin the phrase "range anxiety," to connote the possibility that their driving trips may be limited in range, or that the driver of the electric vehicle will be stranded without recharging options. It is this problem of range anxiety that prevents more electric car enthusiasts from switching to pure electric cars, and abandoning their expensive fossil fuel powered vehicles.

It should be understood that in addition to standard battery technology, storage of electric energy can also be accomplished using alternate or emerging technologies. One such technology is referred to as ultra-capacitor technology. Broadly speaking, an ultra-capacitor is a device for the efficient storage of power. An ultra-capacitor is also known as a double-layer capacitor, which polarizes an electrolytic solution to store energy electrostatically. Even though it is an electrochemical device, no chemical reactions are involved in its energy storage mechanism. This mechanism is highly reversible, and allows the ultra-capacitor to be charged and discharged hundreds of thousands of times. An ultra-capacitor also has a lifetime that is greater than conventional batteries, and is resistant to changes in temperature, shock, overcharging, and provides for rapid charging. These types of batteries also require less maintenance than conventional batteries and are more environmentally friendly because they lack common toxic chemicals utilized in standard batteries.

It is anticipated that charge storage technology will continue to improve over time to provide additional charge capacity, lighter weight, and smaller form factors. As such improvements continue to evolve, the embodiments described herein which refer to "batteries," should be broadly construed to include any type of electric fuel storage.

The cost for the charge can also be provided with a green rating, which signifies how efficient the charge station is in supplying charge, and the location and source of the charge provided by the charging station. If the charging station obtains charge from wind power, the green rating would be high. If the charge station receives its charge from fossil fuels, the green rating may be lower. If the charging station receives is charge from a variety of different sources, whether solar, wind, or fossil fuel, the green rating can be adjusted. This metric information can then be provided to the cloud processing to allow users of electric vehicles to decide whether or not to visit a particular charge station or charge plug.

Accordingly, the generated maps/paths for users are incentivized to provide the user with the desired sponsored path for obtaining charge. Broadly speaking and without limitation, obtaining charge will include plugging the vehicle into a charging receptacle so as to charge the native battery of the vehicle. In another embodiment, obtaining charge can also include refilling on volt bars to replenish volt bars that have been used during the vehicle usage. In other embodiments, charge can be transferred to a vehicle wirelessly (e.g., without plugging in an outlet or receptacle). Examples can include a transfer surface that the vehicle parks over, and the charge can be transferred wirelessly to the vehicle via conductors on the underside of the vehicle. The vehicle can simply park in the slot and once payment is made, the charge can start to flow capacitively or wirelessly to the electric vehicle.

Electric vehicle charging requires more planning than for refueling of gasoline vehicles, as there are limited places to recharge vehicle batteries and the charge time is typically hours instead of a few minutes. At peak times and locations there will be more demand for recharging spaces than there are available charging stations or charging capacity. As the quantity of electric vehicles on the road continues to grow, finding ways to manage electrical vehicle charging continues to be a priority.

As electric vehicles and/or hybrid electric vehicles have gained popularity, an associated need to manage delivery of electrical energy to such vehicles has increased. Moreover, a need to provide safe and efficient charging devices or stations has been created by the increased use of such vehicles.

At least some known electric vehicles include an internal battery that is charged using a charging station. Such charging stations typically include a power cable or another conductor that may be removably coupled to the electric vehicle. The charging stations receive electricity from an electric utility distribution network or another electricity source, and deliver electricity to the electric vehicle battery through the power cable.

Some known charging stations are positioned in public or publicly accessible locations, such as parking garages or parking lots, to provide paid charging services to customers who park electric vehicles within the locations. Depending on a state of charge of an electric vehicle battery and a capacity of an associated charging station, it may take several hours or more to charge the battery.

Electric-powered vehicles such as hybrid vehicles or battery electric vehicles or AVs, refuel by charging electricity to a traction battery via charging infrastructure such as charging stations. Depending on the specific configuration of a charging station and vehicle battery, it may take hours even days to complete a charging process. When the charging infrastructure is limited as compared to the number of the electric-power vehicles, it may be difficult to schedule the charging for each vehicle efficiently. For instance, there may be vehicles finished charging but still occupying the charging station, while other vehicles waiting in the line cannot use the charging station because there is no vacancy.

The standard American electrical socket provides 120 volts A/C (alternating current). The common availability of the 120 volt A/C electricity supply makes it a convenient choice for the power supply for recharging the batteries of electric vehicles. Many garages, carports, or outdoor parking areas may currently have 120 volt A/C electrical outlets, or may easily have one added, so that the power source may be connected to the electric vehicle for Level I charging. The 120 volt A/C electricity supply, however, is often insufficient to recharge the batteries of an electric vehicle in a period of time to allow for convenient use of the electric vehicle. A full recharge may not even be completed overnight and partial recharges often take too much time to be practical. Providing a higher voltage electricity supply can greatly reduce the amount of time needed to recharge an electric vehicle. Such high voltage sources are available in homes and other locations, and may be used for Level II charging.

It is desirable to provide a convenient way of connecting the Level I or Level II electricity source to an electric vehicle to recharge the batteries thereby making recharging quicker and using an electric vehicle more practical. It is also desirable to provide a convenient way to plug the electric vehicle supply equipment to either a Level I or Level II electrical supply source using plugs and receptacles designed to meet National Electrical Code (NEC) and National Electrical Manufacturers Association (NEMA) standards, and with minimal duplication of components. This will reduce the cost of the product, installation, service repair, relocation and greatly simplifying the local electrical permitting process. This will also make the electric vehicle more practical, acceptable and provide a lower cost of ownership for the vehicle consumer.

Autonomous vehicles, while not experiencing the "range anxiety" of vehicles occupied by humans, still require charging in advance of their battery life being depleted. Occupants of an AV that is low on charge may experience consternation as to whether they may be a charging station nearby to prevent being stranded without power to complete the trip they are engaged in. The autonomous vehicle therefore must assume the responsibility to locate a charging station that can provide the charge necessary to prevent the expiration of charge of the AV batteries.

Over the past years the automobile and technology industries have made significant leaps in bringing computerization into what has for over a century been exclusively a human function: driving. As safety has been a main emphasis in motor vehicles for the past decades, there remains a stubborn and inevitable problem at the heart of the fatalities suffered each year: the driver is human. The automobile, which has followed a path of steady but slow technological evolution for the past 130 years, is on course to change dramatically in ways that could have radical economic, environmental, and social impacts.

New cars increasingly include features such as adaptive cruise control and parking assist systems that allow cars to steer themselves into parking spaces. Companies are attempting to create almost fully autonomous vehicles (AVs) that can navigate highways and urban environments with almost no direct human input.

AVs could enable smarter routing in coordination with intelligent infrastructure, quicker reaction times, and closer spacing between vehicles to counteract increased demand. The first autonomous systems, which are able to control steering, braking, and accelerating, are already starting to appear in cars. Thanks to autonomous driving, the road ahead seems likely to have fewer traffic accidents and less congestion and pollution. Automation could theoretically allow nearly four times as many cars to travel on a given stretch of highway, saving almost three billion gallons of fuel each year in the US alone. With electric vehicles, the reduction in carbon emissions would be tremendous.

Driverless vehicle technology (or autonomous vehicles—"AV") promises to reduce crashes, ease congestion, improve fuel economy, reduce parking needs, bring mobility to those unable to drive, and eventually revolutionize travel. Based on current research, annual U.S. economic benefits could be around $25 billion with only 10% market penetration. When including broader benefits and high penetration rates, AVs may save the U.S. economy roughly $430 billion annually. AV operations are inherently different from human-driven vehicles. They may be programmed to not break traffic laws. They do not drink and drive. Their reaction times are quicker and they can be optimized to smooth traffic flows, improve fuel economy, and reduce emissions.

Connected and autonomous vehicles (CAVs) are poised to revolutionize the way goods, services, and passengers are transported. There are numerous benefits of CAVs, with the most relevant being driver/passenger safety, increased roadway capacity, reduced congestion, and potential reduction in emissions. Regarding safety, CAVs can eliminate the possibility of human error, which causes 94% of accidents (NHTSA, 2017). In addition, under the control of sensors and algorithms, the lateral and longitudinal distance between vehicles can be safely reduced with a faster perception-reaction time, thus allowing more vehicles in the same space. Finally, application of CAVs such as truck platooning can decrease frictional drag and increase fuel economy. CAV technology also disproportionately benefits younger, older, and disabled people by providing access to transportation means currently out of reach (Atkins, 2016) and increases safety for this demographic. The list of benefits is reflected in the projected demand for CAVs.

An AV system that relies on optical sensors can be expected to have reliability problems. The signs or markings can be obscured by dirt, ice, or snow and visibility can be impaired by fog, blowing snow, blowing dust, and the like. Furthermore, for night usage, a considerable amount of energy must be expended, either to illuminate the signs or to send out a beam from the sensor.

If autonomous driving is to change transportation, however, it needs to be both widespread and flawless, while also being attractive to the consuming public. Google has developed prototype AV's that have large, unsightly devices on vehicle roofs, featuring huge rotating laser scanners. The driving public desires systems that have style as well as functionality, and thus there is a need for smaller, more limited sensors that can be positioned into the body of a car without compromising weight or styling.

One barrier to large-scale market adoption is the cost of an AV system. Presently, AV technologies include expensive sensors, communication and guidance technology, and software for each automobile. Another problem is that vehicles, at any given time, will vary in the newness of their individual computer systems that regulate the self driving capabilities. For a multitude of vehicles to cooperate on a roadway, there is a need for a coordinated system and method that avoids outdated information.

Another problem presenting designers of AV systems is the threat of a terrorist attack, thus disrupting transportation in particular cities, etc. Centralizing all the sensor elements in a vehicle, rather than having some sensing elements separate from the vehicle, would permit attacks to the vehicle systems to render them unworkable. Conversely, having a more dispersed system where sensors can both be less expensive and that rely on a standard extra-vehicular component (e.g. pavement markings as described herein that work in a system to communicate with vehicle installed systems), one would be better able to avoid the prospect of an attack on particular AV systems. One advantage of certain aspects of the present invention is that disrupting a vehicle's communication or sensors systems would require a more complex and sophisticated attack. Engineering an attack to simultaneously compromise a fleet of vehicles, whether from a point source (for example, compromising all vehicles near an infected AV) or from a system-wide broadcast over infected infrastructure, would pose even greater challenges for a would-be attacker.

Providing AV travel data including routes, destinations, and departure times to centralized and governmentally controlled systems is likely more controversial, particularly if the data is recorded and stored. Without safeguards, this data could be misused by government employees for stalking individuals, or provided to law enforcement agencies for unchecked monitoring and surveillance. Vehicle travel data has wide-ranging commercial applications that may be disconcerting to individuals, like targeted advertising. Decisions to enhance traveler privacy ideally should be balanced against the benefits of shared data. Thus, a system that has at least some elements that are self-contained in the vehicle to frustrate an all inclusive control of such vehicle and/or information being discerned from such vehicle may be desirable.

Some have postulated that there are two basic approaches to autonomous navigation of vehicles on roads: 1) employing a vehicle that navigates like a human, with little pre-existing knowledge of the road features beyond simple maps and general rules of the road; and 2) an approach that relies on extensive prior knowledge of the environment provided by GPS measurements, a map of all stop signs, and pedestrian crossings. Prior inventors have noted the challenging aspects of the first approach due to the extreme variability of real-world environments. Thus, many have pursued systems that involve the second approach, such as the Defense Advanced Research Project Agency (DARPA) Urban Challenge and the Google self-driving car project. While it has been possible to achieve significant reliability using the second approach, such systems require constant updating of detailed prior maps that must be extremely precise and accurate. GPS also does not provide the precision necessary to stay within a lane of traffic; it severely degrades in environments with multipath or shadowing; and the signals can easily be blocked or intentionally disrupted by others desiring to interfere with operation. Inherently, such systems lack the ability to address unexpected changes to the environment where the vehicle is traveling, thus potentially causing significant problems with employment of autonomous vehicles on a wide and large scale. The present invention is directed to the provision of a system that preferably includes both approaches and thus, provides the structured environment and the real time adjustability of a device that can assure the safe transport of people in such self driving vehicles.

Prior art autonomous vehicle systems that sense the local environment and register the sensor measurements to a map of prior observations often require map-matching that depends significantly upon the type of sensor and the locale. Passive visual methods that rely upon digital video cameras perform poorly in outdoor environments due to changes in scene illumination, variations in solar illumination angles, cloudiness, etc. Visual sensing, an approach used by the Google car, require that a sensor transmit light, typically at frequencies that are otherwise relatively dark, and measures the intensity of the return. Algorithms are then used to search for similar intensity patterns in a map of previous measurements to determine the location of the vehicle. But such systems are less than preferred in various adverse weather conditions, such as in snow storms, fog, rain and dust, where important features required to match a scene to prior acquired scenes may be obscured and negatively impact performance. Moreover, other moving vehicles, features that move in wind gusts, etc. present significant challenges, demonstrating that there is still much to be desired and are simply not robust enough to address common real-world conditions. Active sensors employing light detection and ranging (LIDAR) sensors are expensive and due to some precision-engineered electro-optical-mechanical parts, are not believed to be especially practicable solutions.

In certain prior art systems, cameras used for determining a vehicle's position in relation to a lane are limited in robustness and reliability. This can be due to technical limitations of the sensor itself, but also due to external problems, such as poor or absent visible lane markings, caused by road wear, water or snow covering the markings, etc.

Some prior art systems typically utilize at least one of a radar/lidar, DGPS/INS and digital map, or camera/video processing sensor to detect the lane markings (or road edges) that delineate a lane boundary. The detected lane-marking range is typically used to determine the lateral position of the vehicle in the lane (i.e., vehicle in-lane position), and a parameter time-to-lane-crossing is calculated based on the in-lane position and the motion of the vehicle.

There have been attempts to place laser and radar scanners inside front and rear bumpers that sweep the road before and behind for anything within about 200 meters of the car. Some systems employ cameras embedded at the top of the windshield and rear window that track the road markings and detect road signs. Vision scanners near side mirrors are employed to watch the road left and right. Other systems employ ultrasonic sensors above the wheels to monitor the area close to the car and differential Global Positioning System receivers are also used to combine signals from ground-based stations with those from satellites to determine the vehicle's location to within a few centimeters of the closest lane marking. Such existing prototype systems have several computers inside the car's trunk to process data gained from the sensors. Software is employed that may assign a value to each lane of the road based on the car's speed and the behavior of nearby vehicles, in order to decide whether to switch to another lane, to attempt to pass the car ahead, or to get out of the way of a vehicle approaching from behind. Commands are relayed to a separate computer that controls acceleration, braking, and steering. Still other computer systems monitor the behavior of everything involved with autonomous driving for signs of malfunction.

While all such systems are useful in arriving at a commercially viable and cost effective vehicle, much emphasis has been placed on the admittedly important aspects of avoiding collisions with other vehicles and obstacles, spot objects on the road ahead and take control of the brakes to prevent an accident. Such systems may lock onto a vehicle in front and follow it along the road at a safe distance and employ a car's computers to take over not only braking and accelerating, but steering too.

Despite such recent advances and prototypes, the dream of total automation is proving to be surprisingly elusive, largely because the sensors and computers employed are too expensive to be deployed widely. For example, the spinning laser instrument, or LIDAR, seen on the roof of Google's cars, while providing a 3-D image of the surrounding world, accurate down to two centimeters, costs $80,000 and is presently too large for practical use as the consumer will demand more stylish, sleek vehicles.

There is a need for an inertial navigation system that provides precise positioning information by monitoring the vehicle's own movement and combining the resulting data with differential GPS and highly accurate digital maps.

A persistent and as yet largely unaddressed problem relates to poor weather conditions, which can significantly degrade the reliability of sensors. Moreover, it may not always be feasible to rely heavily on a digital map, as so many prototype systems do, as even a very accurate map may be inaccurate and wrong and the work of keeping such maps up to date is a daunting and ongoing task that presents too much liability for wide acceptance of systems so dependent on the same.

While total autonomy of a self driving vehicle may not be imminent—if even desired—there needs to be better systems that are cost effective and that can reduce the number of lives lost, gallons consumed and stress experienced in the evolution of self driving vehicles. As the airline industry appreciates that auto-pilot systems have greatly advanced the safety and reliability of the airline industry, there is still an appreciated aspect of personal human involvement in such vehicles, and hence the need to have experienced and trained airline pilots to work in cooperation with such automated systems. Similarly, in some embodiments, it is envisioned that vehicles may have very useful and beneficial systems that provide various features that can assist in achieving a reduction in the number of lives lost due to the absence of such driving systems.

Another drawback with proposed systems is that they require that essentially all involved vehicles must be provided with transmitter/receivers of similar kinds and types and may rely upon different information systems that are made by different companies. Standardization of such systems may be difficult if not impossible due to the way the technology is developing, the ownership of proprietary rights involved in any given system, etc. For at least some time, the majority of vehicles on the road will simply most probably not be equipped with an active safety system, and thus, even if one vehicle detects a collision risk, others will not. There is thus a need for a system and method that has at least some aspects that are separate and apart from individual vehicles that can be relied upon as a standard by which other competing systems of vehicle makers can rely, to accomplish the general objective of avoiding collisions and saving lives via a cost effective system and method.

SUMMARY OF THE INVENTION

One drawback with electric vehicles is that the range provided by batteries is limited, and the infrastructure available to users of electric vehicles is substantially reduced compared to fossil fuel vehicles. Electric vehicles must carefully plan their driving routes and trips around available recharging stations. The scarcity of recharging stations in and around populated areas causes "range anxiety." To address this anxiety, many of the embodiments of the present invention provide a solution to this problem.

In various embodiments, the present invention involves a system and method for delivering electric energy to an electric autonomous vehicle. Autonomous vehicles are guided to electric charging stations or kiosks where an energy delivery point is configured to couple to the electric autonomous vehicle via a connector or a wireless energy source. The energy delivery point delivers energy to the electric autonomous vehicle via the connector. The AV is guided via the use of specialized lane marking components that permit unprecedented sensor feedback despite adverse weather conditions, which presently pose problems experienced by self-driving systems that rely upon vision based camera systems.

Broadly speaking and without limitation, obtaining charge may include plugging the vehicle into a charging receptacle so as to charge the native battery of the vehicle. In another embodiment, obtaining charge can also include refilling on volt bars to replenish volt bars that have been used during the vehicle usage. In other embodiments, charge can be transferred to a vehicle wirelessly (e.g., without plugging in an outlet or receptacle). Examples can include a transfer surface that the vehicle parks over, and the charge can be transferred wirelessly to the vehicle via conductors on the underside of the vehicle. The vehicle can simply park in the slot and once payment is made, the charge can start to flow capacitively or wirelessly to the electric vehicle. Certain embodiments of the present invention involve a kiosk system that is connected to the Internet so that electric vehicles, and particularly autonomous vehicles, can access an application that can identify locations of kiosk systems with available charging stations. In certain embodiments, the application includes software that communicates with an application sitting in a central hub that manages all of the kiosk systems deployed in the field. The kiosk systems report the status of available charging slots, as well as discounts available at particular kiosk systems. By compiling this information, the kiosk system can interface with the central hub, which provides information to users accessing an Internet application (mobile application), so that electric vehicles, preferably autonomous vehicles, can locate the closest kiosk system or the closest kiosk system having discounts.

Vehicles with electric motors are usually charged by plugging the vehicle directly into a charging station. Wireless charging technology is becoming an increasingly popular alternative to plug-in charging. Wireless charging requires proper alignment between a charger (e.g., a charging pad on the ground) and a charge receiving device on the vehicle. If the charge receiving device and the wireless charger are misaligned, charging efficiency is adversely affected. Sometimes, the location of the charger is not readily visible, for example, when the charger is covered by rain or snow. Further, once the vehicle is driven close to the charger, the driver can no longer see the charger and may therefore experience difficulty maneuvering the vehicle into a charging position. In certain embodiments, the determined position of the vehicle is used to compute a trajectory to the wireless charger, in order to perform automated parking to bring the vehicle into a charging position relative to the wireless charger or to assist the driver with manual parking (e.g., through presenting a visual representation of the trajectory and/or a visual representation of the vehicle or a charge receiving device of the vehicle relative to the wireless charger on a display device of the vehicle). The charge receiving device may be electrically coupled to a battery that powers an electric motor of the vehicle, to a battery that starts a vehicle engine, or to some other load in the vehicle. In certain embodiments, a method for aligning a vehicle to a wireless charger includes performing wireless communication between at least a first wireless device of the vehicle and at least a second wireless device external to the vehicle, where the first wireless device has a stationary position relative to the vehicle, and where the second wireless device has a stationary position relative to the wireless charger. The method further includes obtaining a measured distance between the first wireless device and the second wireless device, and determining, based on the measured distance, a position of the vehicle relative to the wireless charger. The distance is measured based on the wireless communication. The method further includes calculating, by a processor of the vehicle, based on the determined position of the vehicle relative to the wireless charger, a trajectory according to which the vehicle can be maneuvered into a charging position in which a charge receiving device of the vehicle is aligned with respect to the wireless charger.

Both electromagnetic induction and electromagnetic resonance wireless charging systems perform electrical energy transfer using electromagnetic induction between a coil in a transmitter and a coil in a receiver. During wireless charging, an oscillation circuit of the transmitter converts electrical energy into a high-frequency alternating current (AC) and supplies the high-frequency AC to a primary coil, the primary coil couples the electrical energy to a secondary coil of the receiver in proximity using a magnetic field that is generated from the high-frequency current, and the secondary coil receives the electrical energy, converts the electrical energy into a direct current (DC) using a converter circuit, and supplies the DC to a load for use.

In one or more embodiments, a system for an artificial intelligence platform for mobile charging of rechargeable vehicles and robotic devices includes a non-transitory memory storing charging information for a plurality of charging stations managed by the system and one or more hardware processors configured to execute instructions to cause the system to perform operations comprising monitoring an operation of a first mobile system and detecting that the first mobile system requires charging of a rechargeable battery during the operation. The operations further comprise in response to the detecting, determining a first charging station of the plurality of charging stations to charge the rechargeable battery at a location and a time based on the operation of the first mobile system and the charging information, and assigning the first charging station to the first mobile system for charging the rechargeable battery at the location and the time.

Once the autonomous vehicle is guided to the charging station, an intelligent vehicle charging system may do one or more of the following: identify the autonomous vehicle, authenticate the autonomous vehicle, verify the autonomous vehicle's payment account, and automatically begin the power charging process. At the conclusion of the power charging process, the appropriate fee is charged to the autonomous vehicle's payment account. An intelligent vehicle charging system allows an autonomous vehicle to drive up to a specified charging station and conduct an autonomous power charging session without any live (human) direction, intervention, or assistance.

According to one illustrative embodiment, a computer system for managing autonomous vehicles is provided. The computer system collects autonomous vehicle energy data and travel data. The computer system determines a plurality of autonomous vehicles that need energy replenishment within a defined geographic area. The computer system determines a rank for each of the plurality of autonomous vehicles that need energy replenishment within the defined geographic area to meet passenger-defined travel destination time constraints. The computer system directs each autonomous vehicle to an energy station in a set of energy stations within the defined geographic area to meet the passenger-defined travel destination time constraints based on the rank of each of the plurality of autonomous vehicles.

It should be understood that in addition to standard battery technology, storage of electric energy can also be accomplished using alternate or emerging technologies. One such technology is referred to as ultra-capacitor technology. Broadly speaking, an ultra-capacitor is a device for the efficient storage of power. An ultra-capacitor is also known as a double-layer capacitor, which polarizes an electrolytic solution to store energy electrostatically. Even though it is an electrochemical device, no chemical reactions are involved in its energy storage mechanism. This mechanism is highly reversible, and allows the ultra-capacitor to be charged and discharged hundreds of thousands of times. An ultra-capacitor also has a lifetime that is greater than conventional batteries, and is resistant to changes in temperature, shock, overcharging, and provides for rapid charging. These types of batteries also require less maintenance than conventional batteries and are more environmentally friendly because they lack common toxic chemicals utilized in standard batteries.

It is anticipated that charge storage technology will continue to improve over time to provide additional charge capacity, lighter weight, and smaller form factors. As such improvements continue to evolve, the embodiments described herein which refer to "batteries," should be broadly construed to include any type of electric fuel storage.

The cost for the charge can also be provided with a green rating, which signifies how efficient the charge station is in supplying charge, and the location and source of the charge provided by the charging station. If the charging station obtains charge from wind power, the green rating would be high. If the charge station receives its charge from fossil fuels, the green rating may be lower. If the charging station receives is charge from a variety of different sources, whether solar, wind, or fossil fuel, the green rating can be adjusted. This metric information can then be provided to the cloud processing to allow users of electric vehicles to decide whether or not to visit a particular charge station or charge plug. In various AV can be pre-programmed to preferably search out green charging stations.

Various embodiments are directed to a method for providing charge options to drivers of electric vehicles, and preferably autonomous vehicles. The method includes receiving data concerning providing the availability to obtain a charge from charge locations, receiving a request from processing logic of an electric vehicle, the request identifying a desire to obtain charge, and determining a current location of the electric vehicle. The method further includes determining identification of charge locations in proximity to the electric vehicle and determining any sponsored rewards offered by the charge locations. The method communicates to the electric vehicle a path to one of the charge locations, and the path identifying a sponsored reward offered at the charge location for the path.

In one embodiment, the discounts provided by the specific kiosk systems can be programmed based on the desire to sell more charging at certain kiosk systems with excess charging inventory. To encourage load-balancing of inventory, discounts can be provided, with each of the kiosk systems enabled with software that communicates with the central hub, and the software utilized to provide the most efficient information regarding inventory, and operational statistics of each kiosk system deployed throughout a geographic region (e.g., geo-location).

Each kiosk system is configured with an interface that receives payment data from the users. Example payment receipts may include credit card swiping interfaces, touch-screens for facilitating Internet payment options (PayPal), coupon verification, and communication of deals with friends through a social networking application. These applications are facilitated by software operating at the kiosk station, or by software executing on the users mobile device, or a combination of both.

In various embodiments, a system is provided that provides a central processing center that communicates with, (i) a plurality of said kiosk over a network, the central processing center configured to provide for centralized rate changes to prices to charge for the charge units at each of the plurality of kiosks, wherein changing the price of the charge units is specific to each of the kiosks and is based on a plurality of metrics, including availability at each kiosk and discounts, and (ii) a plurality of vehicles, the plurality of vehicles being provided with access to availability of information of charge units at each of the kiosks, the availability of information being custom provided to the plurality of vehicles based on geo-location.

In yet other embodiments, a computer processed method for providing charge options to drivers of electric vehicles is provided, and alternatively for AV. The electric vehicles and AV have wireless access to a computer network. Such method includes receiving data concerning charge providing availability from charge locations and receiving data concerning sponsored rewards offered by the charge locations and rules for offering the sponsored rewards. The method receives a request from processing logic of an electric vehicle or AV, and the request identifies a desire to obtain charge in route between a current location of the vehicle and a destination location. The method includes generating a plurality of paths that can be traversed by the electric vehicle or AV between the current location and the destination location, where each of the paths identify possible charge locations at which the electric vehicle or AV can be charged. Each of the possible charge locations identifying any sponsored rewards offered if the electric vehicle or AV obtains charge at the possible charge locations. The method includes forwarding the plurality of paths as options to the user of the electric vehicle or AV via a user interface. The sponsored rewards are identified to the user to enable tradeoffs between length of path and reward obtained.

In still other embodiments, electric vehicles or AVs that use replaceable and exchangeable batteries, applications for communicating with a service that provides access to kiosks of batteries, and methods and systems for finding charged batteries, reserving batteries, and paying for use of the batteries, are disclosed.

In certain embodiments, the vehicle further includes wireless communication circuitry configured for wireless communication between the electric vehicle or AV and a device when linked for wireless communication with an application of the device. A computer on-board the electric vehicle or AV is interfaced with the wireless communications circuitry and is configured to interface with the batteries to access a level of charge of the batteries present in the receptacle slots to enable data regarding the level of charge to be accessed by the application. A display panel of the electric vehicle or AV is configured to display information regarding the level of charge of the batteries in the receptacle slots.

In certain embodiments, a system and method is provided for delivering energy to an electric vehicle, preferably an AV. The system includes an energy delivery point configured to couple to the electric vehicle via a connector and a server sub-system coupled to the energy delivery point via a network. The energy delivery point delivers energy to the electric vehicle or AV via the connector. The server sub-system determines a parking cost for the electric vehicle or AV, and determines transaction costs based on at least one of an amount of energy delivered to the electric vehicle or AV and the parking cost.

For charging accumulator devices, using an alternating voltage supply network, an alternating current/direct current converter is employed that supplies a direct voltage having an adjustable and suitable level. Alternating current/direct current converters are preferably within the vehicle. The connection between an alternating current interconnected network and a vehicle is a simple cable for charging the accumulators, with the vehicle connected to an alternating voltage supply network.

One aspect of many embodiments of the present invention is the provision of an improved extra-vehicle component to an overall near-autonomous self-driving vehicle system and method. Several embodiments are directed to pavement markings that permit unprecedented sensor feedback such that adverse weather conditions do not pose the problems presently experienced by self-driving systems presently employed. Having pavement markings that incorporate, for example, magnetic aspects that can be detected by sensors located in a vehicle can offer the desired redundancy required to ensure a safer and more robust system that facilitates self-driving and steering mechanisms and systems for vehicles. Certain aspects of such paving material employ magnetic particles that are oriented during the placement of the material on a roadway. For example, in several embodiments, particles are dispersed in a wet paint form of pavement marking and a magnetic field is then directed to and in close approximation to such wet point so that the particles are directed to face a desired position once on the roadway, with such particles being essentially maintained in such a direction when the paint dries. In other systems, magnetically adjustable elements are associated with the pavement material such that such elements are pre-loaded into or on the surface of pavement markings such that such elements can be oriented in a desired direction via outside magnets passing over such markings. Thus, one aspect of the present invention is directed to a method and system whereby some of the directional and data communication system and method of self-steering and driving vehicle systems is in the pavement marking material, rather than in the on-board systems of the vehicles. In this manner, the tremendous cost and expense of sophisticated systems envisioned for self driving vehicles can be vastly reduced as the pavement marking material itself will have advanced aspects that permit less expensive and refined sensor systems to be employed, adding to the safety and reliability of the overall self driving experience. In certain embodiments, the elements presently employed in so-called "smart-systems" utilized with credit cards, ID systems, etc. can be employed with respect to pavement marking materials so as to add an extra-vehicular control system to an overall AV traffic control system. In one embodiment, a strong electro-magnet is brought into close proximity (e.g. preferably between about 5 millimeters and 10 centimeters) with newly laid-down paint (or alternatively pavement marking materials with imbedded magnetically directable elements therein) of the type mentioned herein, which include particles having desired magnetic and directional characteristics, with such particles coming under the influence of the strong magnetic field such that they are collectively pulled in a direction while in the liquid or semi-liquid phase of the pavement marking material (e.g. wet paint) exists; or alternatively the pavement marking material is constructed so as to provide the ability of magnetically attracted elements to be moved and oriented at any time during the useful life of such pavement marking material. Some pavement marking materials will therefore be flexible in this regard and will permit movement and different orientations of magnetic elements so that a pivotal ability of the pavement marking material persists well after it is provided on the roadway surface.

While radar sensing is possible, along with sonar or sound sensing, one is limited in correctly reading and interpreting radar or sonar echoes to insure obstacles are avoided and turns are made properly. Video sensing techniques based on current technology, using video cameras, may operate satisfactorily in daylight and in periods of good visibility but at night and in periods of poor visibility video systems are of little or no value. The present invention provides a relatively easy means of acquiring required road information as well as vehicle position relative to the center line of the desired path (lateral deviation).

In certain embodiments, there is an ability to modify the pavement marking materials via applying a force to physical or magnetic components imbedded or otherwise associated with such pavement materials, such that when roadway managers desire to change the resident signaling of such materials, they can be modified for such purposes. In one embodiment, such a change to the directional aspects imbedded in the pavement material is achieved by having a specialized vehicle run directly over the pavement material so as to modify orientation of particles residing in the pavement material. For example, magnetically directional aspects of the pavement material may be modified by having a strong electromagnetic element run over the surface of the pavement material in a fashion such that there is a realignment of the magnetic particles or elements in the pavement material.

There is a need for, at minimum, a fine tuning of a self-steering vehicle's movements in real time—as well as a back-up redundant system that would operate if the various map-dependent, infrared sensors and/or GPS systems fail, or are inaccurate, etc. While "vision systems" may be employed to "read" the paving markings on the existing roads—e.g. seeing yellow and white lines, etc.—adverse weather conditions can often obscure the same and make such camera sensors impractical or ineffective. One aspect of the present invention relates to the ability of pre-determined directional aspects of the pavement marking material to be coded so that roadway management systems appreciate a digital recognition of the type and kind of roadway marking involved. Thus, for example, a certain magnetic element orientation would be indicative of a white stripe, while another orientation would be indicative of a yellow stripe, stop sign, yield zone, merge zone, traffic condition, etc.

Another aspect to the present invention is directed to the provision of new paving marking material that may communicate with reliable sensors located on vehicles that can "read' the location of such markings on the pavement itself, thus ensuring that the vehicle is moving as it should. Thus, various paving markings are envisioned, including: special paint that has laser light reflecting elements (e.g. small mirrors—some of which may be associated with metallic elements such that when the paint is wet (or a flexible substrate is employed with the particles imbedded therein) a magnet passed over the freshly laid paint will orient the particles so that there is a directional aspect to the paint— and thus, the sensors (or lasers) can better reflect off such pre-determined directional markings. The system should preferably be accurate and fine tuned so as not to read opposing closely laid paint for on-coming traffic lanes etc. Other sensors can be employed that rely upon magnets, metallic elements, and spaced apart features such that the vehicle systems can "read' the same (similar to a metallic stripe being detected or "seen" regardless of weather conditions) and verify coordinates to either steer the vehicle and/or to act as a redundant confirmation system of the vehicle's movements in a GPS guided system. In such a manner, for example, the present invention may provide a vehicle roadway guidance/control system wherein pavement markings may be serially oriented so that a binary code is formed by passage over the passive markers.

Pavement marking, including but not limited to pavement paint on roads, is necessary and occupies a large amount of state and governmental resources every year. Replacement paint is required over time- and with self-driving vehicles, it is believed that a practical system will need to employ pavement markings, including paint that is so-called "smart"—so as to assist in the conveyance of vehicles along roadways. Thus, various road-marking systems and methods are described herein that are useful in the new generation of self-steering vehicles that are being developed. The coordination of municipalities, cities, states, governments, etc.

with existing vehicle production companies—especially with a standardized pavement marking system and method, is preferably a desired and useful advancement in the provision of a life-saving, fuel saving system and method that promises to greatly enhance and advance safety, reliability, redundancy, and practical implementation of such a system.

In one embodiment, the addition of metallic shot or particles, or other materials having a high dielectric constant, to a thermoplastic paint or marking material, is used to paint or mark lane stripes on pavement and is used in combination with a vehicle containing suitable detection equipment that can detect the additive material in the painted stripes. Thus, in certain embodiments, small magnetic particles are mixed into the pavement marking ingredients as part of a liquid, which can be coated or extruded in a thin strip onto a roadway surface, allowed to cure, solidify and then harden. Preferably, such pavement marking material is designed to seep into the rough surface and pores characteristic of roadways, such as cement and asphalt, and hardens to form a firm grip or bond to the pavement. In certain preferred embodiments, the incorporation of metal particles and/or high dielectric particles is used within the thermoplastic material of ordinary road marker paint. A preferred embodiment of the enhanced radiometric paint includes size 20 or 30 iron shot with the iron shot comprising approximately 30% of the paint mixture by volume. In other embodiments, however, use of various sized and shaped iron based materials can be employed having non-round shapes. The percentage of such material in certain embodiments can be as little as 5% and as much as 75%, preferably at least about 10% and less than 28%, or alternatively, more than 50% but less than about 70%.

In certain embodiments, the placement of passive markers on pavement to define traffic lane boundaries enables a vehicle having proper detection equipment and traveling in the lane to detect the lane boundary, as a redundant system working in coordination with the other location devices and systems as described herein. These embodiments allow economical placement installation of passive markers on roadway surfaces, reasonable durability and life of the markers, and consequently enable economical detection systems to be used in motor vehicles. In one embodiment, the use of wafer-thin elements embedded in painted or pre-made polymeric material traffic lane stripes is employed. These elements may, in certain embodiments, utilize the same technology as used commercially in many in-store anti-theft systems, pet identification systems, and PASS highway toll systems, and can be economically fabricated in mass-produced quantities.

In various embodiments, on-board sensing devices are installed in motor vehicles, one on each side near the front of a vehicle, such as in front of each front tire at the bottom of the front bumper. In a particularly preferred embodiment, such sensing devices are included in the tires or wheels, or both, of vehicles, thus providing a ready way to have numerous vehicles retrofitted in a manner that keeps up with advances in the AV system itself. Municipalities or Federal Governments may choose, for example, to offer tax based incentives to have consumers purchase new tires/wheels that permit far more vehicles, in an economic fashion, to obtain necessary sensor devices to make possible a robust AV system for a particular area.

In many embodiments, the aiming of each sensing device is preferably down and slightly outboard and each sensing device may preferably incorporate both a transmitter and receiver. In certain embodiments, signal reflecting tags or labels, preferably very small so that they reside in the pavement marking material, are employed to respond to a signal emanating from the vehicle with sufficient strength to return a signal. Thus, when such a signal is incident on an embedded tag or label, and the received strength is sufficient to cause the tag or label to reflect a return signal, the return signal is picked up by the sensor receiver. The passive elements may, in certain embodiments, be in the painted lane stripes such that they respond to different frequencies based on the location of the particular stripe so that an on-board processor used for detection will be able to distinguish individual stripes on a roadway, such as distinguishing a centerline stripe that separates oncoming lanes from a shoulder stripe, turn lane, cross-walk, etc. Alternatively, system may be employed where signals emanate from the road to the passing vehicles, and in other embodiments a mix of signals from and to the roadway are used to accomplish the objective of a workable, economically feasible system.

A related aspect of the present invention is directed to an ability to re-charge the magnetic qualities of imbedded material in a pavement marking system. Thus, periodically a strong magnetic force is re-applied to existing pavement marking material so as to further energize the signal transmission characteristics thereof. Such a system may include vehicles of a traffic management governmental authority that have high powered magnetic elements associated therewith that pass over and re-energize the metallic elements in the pavement marking material on the roadway. Solar powered recharging systems may also be used to retain the magnetic characteristics of the resident road located materials so as to maintain a robust AV system.

In one embodiment, a vehicle position recognition system includes at least one magnetic marker for forming a magnetic field at a predetermined position on the road surface and at least one magnetic sensor for detecting the intensity of the magnetic field formed by the magnetic marker. An on-vehicle detector is provided for performing operation of the vehicle position on the basis of the magnetic field intensity obtained from the magnetic sensor. Problems experienced with prior art systems are avoided due to the redundancy and combination of different data input from GPS and other location features, in combination with the features (including the magnetic pavement marking system/method as disclosed herein) of the present invention. Thus, in the event there is a problem involving a magnetic field being wrongly detected, or it is not detected, due e.g. to a magnetic body that may disturb the magnetic field when a vehicle is traveling down a traffic lane, such as for example a piece of magnetized metal in the joint of a concrete road or the structural body in a tunnel; or some other feature that forms a magnetic field larger than that of the magnetic field emanating from a magnetic pavement marking, such issues are readily addressed via the receipt and combination of GPS, visual camera and other location sensors employed in a preferred embodiment of the present invention. The coordination and comparison of these distinct and various inputs can act to arrive at inconsistencies such that unusual situations can be recognized and addressed by an AV system. In such a manner, the present invention provides a vehicle position recognizing system that reduces problems that could be caused by undesired magnetic disturbances when a vehicle is conveyed down a traffic lane, thus permitting the system to properly detect the intended pavement marker and its magnetic signal, in conjunction with other positioning systems, thus accurately determining the position of a vehicle. One of skill in the art will appreciate the myriad of ways that such signal comparison can be performed to achieve the desired AV system result.

Various embodiments of the present invention are directed to the employment of automated vehicle roadway beacons. Thus, in certain embodiments, the invention comprises the use of location beacons that are installed in or near roadway surfaces to affect the path that vehicles traverse on roadways. These location beacons may be any single embodiment or combination of conductive, magnetic, visible light, infrared, ultraviolet, x-ray, or gamma-ray light beacons. They are installed within the roadway surface or near the roadway surface to provide accurate vehicle position information for "autonomous" vehicles.

One aspect of the present invention is directed to the particular ability to update software over the air for vehicles to add, modify or subtract certain functions, such as to adapt to new advancements in pavement markings that can be read by the car in snowy conditions etc. This is similar in many ways to the automatic updating of smart phones and mobile computers but importantly is done to further the operational aspects of a coordinated AV public system that has the ability to save many lives and prevent tragic accidents. One example of a particular update that would be involved is the updated maps developed and generated by AV vehicles traveling on roads that may have defective lane recognition systems, thus permitting servicing of such area before any detrimental accidents occur and otherwise informing system management personal as to where resources should be employed to facilitate a well run system.

In one variant of the invention, small sealed gamma radiation sources (i.e., Cs137, Am241, etc.) may be embedded in the roadway surface along the centerline of the traffic lanes (preferably in addition to other magnetic-based AV system components.) The radiation sources are preferably spaced sufficiently far apart so that the radiation areas from each source overlap enough to affect an invisible path for an automated vehicle to follow from one radiation source to the next and to create an invisible barrier between opposing traffic lanes. X-ray sources can also be employed in addition to or in place of gamma ray sources, with x-rays being manipulated to emit varying energies of x-ray radiation to communicate different road conditions.

Automated vehicles possessing radiation detectors are used to adjust the direction of the vehicle to align with the path of the radiation sources based on the amplitude of the radiation detector(s) on the vehicle. On multi-lane roadways, the vehicle may be programmed to move to the left or the right of the lane presently occupied by the vehicle to re-establish a path in the new traffic lane for the vehicle to follow. In preferred systems, gamma radiation sources are used in combination with at least one other of the pavement marking systems described herein, including the magnetic element pavement marking system described herein.

Employing the present invention, the path of an automated vehicle is not affected by weather conditions including: rain, snow, ice, dirt, sand, or other material that may obscure the visible roadway surface. Another advantage to this form of lane designation is that detours may be installed on temporary road paths around road construction zones simply by placing radiation sources in an appropriate path around the construction zone. The preferred embodiment of this type of roadway marking system includes the use of radioactive half-life longevities of over 20 years and the amount of radiation exposure to living beings will be less than 2 mR per hour at the surface of the roadway pavement, in accordance with NRC (Nuclear Regulatory Commission) mandates.

In still another embodiment of the invention, pavement marking materials include thin-film conductive materials such that they are embedded with or associated with a roadway surface in a manner that permits them to conduct either an AC or DC current. Automated vehicles equipped with sensors may then follow the path of the embedded current, and conductors carrying a different current or voltage may be installed between lanes of opposing traffic to prevent the automated vehicles from crossing into an oncoming traffic lane. In still other embodiments, such a system permits current to flow in the traffic lane conductors to charge electric automated vehicles. Pavement marking materials may also include piezoelectric elements able to generate electricity by converting mechanical energy of vehicles driving over the piezoelectric elements- to electric current. Preferably, infusion of power along the roadway is provided by solar charged batteries associated with the thin-film conductive materials. In still other embodiments, anti-pest components, such as pesticides, are provided with the pavement marking to deter insects from eating insulation, etc. that could otherwise short out a system.

In yet another embodiment of the invention, permanent magnets may be installed in the pavement marking materials, providing an invisible path for an automated vehicle to follow from one magnet to the next. Automated vehicles with magnetic detectors are then able to adjust the direction of the vehicle. A magnetic system offers several advantages: it is not adversely affected by weather conditions, does not require expensive video or other radio frequency equipment, and uses little to no power to achieve its magnetic marker function. Preferably, the coercivity of the magnetic material used in the pavement marking is at least above 1000 oersteds. Advances in metallurgy and magnetic technology in the last decades have resulted in the availability of magnetic materials with unprecedented power—most notably "Rare Earth" magnets, some of which exhibit a pulling strength of more than 100 times their own weight. They do not suffer significantly from problems like degrading over time or sudden loss of magnetic power due to exposure to moderate external magnetic influences or the removal of keepers, as 'traditional' permanent magnets tend to suffer. The rare earth elements are fifteen elements with atomic numbers 57 through 71, from lanthanum to lutetium, plus yttrium. Despite their name, rare earth metals aren't actually that rare but they typically occur in ores at low concentrations, and often in tandem with radioactive elements like uranium and thorium. Permanent magnets made from alloys of REEs with transition metals and boron enable commercial production of the strongest permanent magnets known today. In various preferred embodiments, REE paint or pavement materials are employed to establish a practical AV system having both vehicle sensors and pavement rooted elements that work cooperatively to achieve the objectives as set forth herein.

To limit the penetration depth of the magnetic field of each magnetic device, permanent magnets with short and fixed magnetic length may be used. In order to increase overall volume of active magnetic material, a plurality of such individual short length magnets may be connected in series to provide a single magnetic field orientation, i.e. each device is comprised of a stack of permanent magnet plates (magnetized in the thickness direction of the plate such that opposite faces have opposite polarities) interleaved with soft iron pole piece plates. In various embodiments, the magnet plates are arranged alternately with faces of equal polarity opposing one another across the intervening pole piece, such that a series of alternating North-South-North-etc. magnetic fields along the stacking direction are present between neighboring pole pieces, thus providing a plurality of working (air) gaps along the stacking direction. That is, the active magnetic material may be subdivided into discrete portions and interleaved and in contact with passive magnetic material, thus creating a plurality of shallow magnetic field loops between the pole pieces.

Preferably, certain aspects of the present invention utilize permanent magnets as a source of a magnet field and can be switched between 'on' and 'off' states. Still other embodiments employ a configuration/arrangement of discrete magnetic field sources which overall generates an effective attraction force between a device, incorporating the arrangement which simultaneously enables substantial confining of magnetic flux lines generated by the arrangement.

Other embodiments employ a pavement marking device having a plurality of magnets, each having at least one N-S pole pair defining a magnetization axis, the magnets being located in a medium having a first relative permeability in a predetermined array configuration with a defined gap spacing between the magnets and with the magnetization axes extending in predetermined orientations and preferably in a common plane, the device having a face operatively disposed to be brought into proximity to a magnetic sensor of a moving vehicle. Such magnetic sensor preferably has a second relative permeability that is higher than the first relative permeability, thereby creating a closed or loaded magnetic circuit between the magnets and the magnetic senor and effecting flux transfer through the magnetic sensor between N and S poles of the magnets.

Preferably, the system provides a self-regulated flux transfer from a source of magnetic energy to a magnetic sensor, wherein a plurality of magnets, each having at least one N-S pole pair defining a magnetization axis, are disposed in a pavement marking medium having a first relative permeability, the magnets being arranged in an array in which a gap of predetermined distance is maintained between neighboring magnets in the array (and consequently the pavement marking medium) and in which the magnetization axes of the magnets are oriented such that the magnets face one another with opposite polarities and preferably extend in a common plane, such arrangement representing a closed magnetic circuit in which magnetic flux paths through the medium exist between neighboring magnets, and magnetic flux access portals are defined between oppositely polarized pole pieces of such neighboring magnets.

A limit of effective flux transfer from the magnetic circuit into the pavement marking medium will be reached when the pavement marking medium approaches magnetic saturation and the reluctance of the pavement marking material substantially equals the internal reluctance of the magnetic circuit. In such array, two kinds of flux portals exist—a first one is between the pole pieces of the individual magnets with a first (forward) flux direction and the second one is between the pole pieces of neighboring magnets in with a second (opposite) flux direction. Therefore, no uniform flux direction exists in the array and fewer problems with remanence in magnetic sensors will ensue after the sensor moves away from a pavement marking medium having such an array. It will be appreciated that the above features defining self-regulating flux transfer can be incorporated into various embodiments of pavement marking mediums.

Magnetic guidance systems of the prior art have been embedded within a roadway. One such system is disclosed in U.S. Pat. No. 3,609,678. The polymer-based magnetic materials disclosed are resilient and flexible, such as nitrile and silicone rubber, and plasticized PVC. Resilient refers to recovering to substantially the original shape after removal of a deformation force. The '678 patent discloses, in one embodiment, a polymeric magnetic tape or sheet that is either inserted edgewise in a narrow channel or slot or laid flat in a more shallow channel cut in the roadway. Magnets may also be embedded within the pavement of the roadway instead of in an open channel. A flux sensor may be mounted on a vehicle that travels over the roadway, and the sensor can generate an electric signal in response to the magnetic medium if the magnetic field is sufficiently strong to be sensed. The intensity of the magnetic field at the surface of the roadway should be at least 2 gauss, preferably at least 10 gauss, and more preferably at least 100 gauss, to provide a strong signal even when road conditions are less than optimal. Although it has its own utility, the system disclosed in the '678 patent may not be desirable because it relates specifically to embedding a magnetic medium in an existing road. That is, this patent discloses cutting a slot, hole, or other aperture in an existing road, inserting a magnet or plurality of magnets in a resilient material within the aperture, and then sealing the aperture to protect the magnets. Certain aspects of the present invention are thus directed to providing either a paint that contains desired magnetic attributes as set forth herein, avoiding the need to physically cut existing pavement surfaces, which entails labor and added expense. Other embodiments employ pavement materials that are otherwise laid down on the surface of pavement and road surfaces to obtain the many benefits of the pavement marking AV system set forth herein.

In certain embodiments, conformable pavement marking sheet materials are preferred that comprise polymeric materials that have desired viscoelastic properties. Preferably, magnetic particles are embedded in such a conformable magnetic layer, whether it be paint or a pre-determined polymeric composite stripe to be adhered to or otherwise affixed to a road surface.

Automated vehicles, preferably those able to generate electric current through induction when passing over the magnetic elements, may be employed in an overall AV system. An automated vehicle may be equipped with magnetic field sensors located on each side of the vehicle (preferably located in the tires or wheels of the vehicle) and the vehicle may then travel in a path centered between the magnetic particle infused paint markings applied to the roadway surface.

To reduce the need to provide extensive disclosure in this application, but to provide adequate written description of the various devices and methods encompassed by the numerous embodiments of the present invention, various patents are incorporated herein in their entireties by this reference. These include: U.S. Pat. No. 7,140,803 to Cummings, et al.; U.S. Pat. Nos. 5,347,456; 6,614,469 and 6,417,785 to Tyburski; U.S. Pat. No. 6,414,606 to Yujiri, et al.; U.S. Pat. No. 5,202,742 to Frank et al.; U.S. Pat. No. 4,947,094 to Dyer et al.; U.S. Pat. No. 3,725,930 to Caruso; U.S. Pat. No. 5,347,456 to Zhang, et al.; 2003/033330 to Pereri; U.S. Pat. No. 7,451,027 to Pereri; US2007/0225913 to Ikeda; 2013/0231829 to Gerdt, et al.; 2013/0231820 to Solyom, et al.; 2012/0265403 to Svensson, et al.; 2012/0203418 to Branennstroem, et al.; 2011/0215947 to Ekmark, et al.; 2011/0320163 to Markkula, et al.; U.S. Pat. Nos. 6,335,689; 7,084,773; US 2007/0021915 to Breed; 2013/0184926 to Spero, et al.; 2013/0218397 to Griffini; U.S. Pat. No. 8,520,954 to Suzuki; U.S. Pat. No. 8,494,716 to Lee et al.; U.S. Pat. No. 8,462,988 to Boon; U.S. Pat. No. 8,456,327 to Bechtel, et al.; U.S. Pat. No. 8,378,799 to Yim, et al.; U.S. Pat. No. 7,791,503 to Breed, et al.; U.S. Pat. No.

8,111,147 to Litkouhi; U.S. Pat. No. 8,717,156 to Tronnier; 20140/207377 to Gupta; U.S. Pat. No. 8,781,669 to Teller; 2014/0121964 to Stanley et al., 2014/0307247 to Zhu; U.S. Pat. No. 8,532,862 to Neff; WO 2013018038 to Sheinker; U.S. Pat. No. 8,451,140 to Piccinini; U.S. Pat. No. 8,290,659 to Asano; U.S. Pat. No. 5,853,846 to Clark; U.S. Pat. No. 6,236,915 to Furukawa; 2003/0123930 to Jacobs (abandoned); 7,451,027 to Peteri; U.S. Pat. No. 7,983,802 to Breed; WO 2014082821 to Protzmann et al.; WO 1996016231 to Dahlin; U.S. Pat. No. 4,490,432 to Jordan; 2014/0267728 to Dahlin; U.S. Pat. No. 6,051,297 to Maier, et al., U.S. Pat. No. 7,680,569 to Matsumoto; WO 2013160238 to Dietrichson; U.S. Pat. No. 8,178,002 to Camardello; U.S. Pat. No. 8,775,060 to Solyom; U.S. Pat. No. 8,352,112 to Mudalige; 2014/0236463 to Zhang; U.S. Pat. No. 8,880,273 to Chatham; U.S. Pat. No. 7,138,750 to Mancosu; U.S. Pat. No. 6,807,853 to Adamson; U.S. Pat. No. 7,832,263 to Rensel; U.S. Pat. No. 6,291,901 to Cefo; U.S. Pat. No. 8,841,785 to Theuss; U.S. Pat. No. 8,352,110 to Szybalski; U.S. Pat. No. 8,527,199 to Burnette; 2006/0033641 to Jaupitre; 2014/0297094 to Dolgov; 2007/0152845 to Porte; U.S. Pat. No. 8,954,261 to Das et al.; U.S. Pat. No. 8,977,420 to Deng et al.; U.S. Pat. No. 9,096,267 to Mudalige et al.; U.S. Pat. No. 9,090,264 to Zhao et al.; U.S. Pat. No. 8,874,301 to Rho et al.; U.S. Pat. No. 9,090,259 to Dolgov et al.; U.S. Pat. No. 9,081,385 to Ferguson et al.; 2014/0225694 to Sitti et al.; U.S. Patent Publication No. 2014/0195093 to Litkouhi; 2015/0266477 to Schmudderich; 2009/0195124 to Abramovich et. al.; 2015/0210274 to Clarke; 2014/130178 to Droz; U.S. Pat. No. 9,129,272 to Penilla; PCT/US2015/018285 to Scofield; 2015/0198951 to Thor; 2002/0174084 to Mitsugi; 2012/0149000 to Baker; U.S. Pat. No. 8,489,648 to Rubin; 2015/0241880 to Kim; 2014/0012431 to Breed.

The disclosures of all of the foregoing United States patents are hereby fully incorporated into this application for all purposes by reference thereto. While various tire electronics systems, magnetic element systems and power generation systems therefore have been developed, no design has emerged that generally encompasses all of the desired characteristics as hereafter presented in accordance with the subject technology.

In one embodiment, a pavement marking device (whether it be a tape, a more substantive road adherent device, etc) is manufactured in a manner to conserve the expensive interactive elements necessary to communicate with sensors located on an automated vehicle. Thus, in a particular embodiment, a pavement marking structure (again, it may consist of a tape, a geometrically shaped road attachable device, etc—collectively referred hereto as a pavement marking structure) is provided that has between one and six separate longitudinal lines/channels extending between a first and second edge of the longitudinal extent of the pavement marking structure. Such lines/channels can accommodate the inclusion of metallic materials specially designed to interact with sensors positioned on moving automated vehicles, and may further retain one or more magnetic components as described herein so as to minimize any excess use of such material beyond what is called for in the road based directional system. For example, in one scenario, a pavement marking structure has at least one line/cannel that includes a series of magnetic particles, rather than having such particles more randomly distributed throughout the pavement marking material (e.g. such as would be the case if magnetic particles were added to a pavement paint mixture.) Having several or a plurality of channels available, makes it possible to make the contents of such pavement marking structures variable depending upon distinct issues that may present themselves, such as different weather and temperature conditions, the need to have a more robust magnetic signal in play (where e.g. two or more of the cannels is filled with magnetic particles to provide a stronger and redundant signal for sensors located on moving vehicles with a magnetic sensor thereon). It will be appreciated, however, that still other embodiments include more random dispersion of magnetic elements in a pavement marking material for use in an AV system.

In various embodiments, pavement marking materials include microcrystalline ceramic beads which have a number of unique properties that result in outstanding performance, including high refractive index and high overall quality. Microcrystalline beads are also tougher than regular glass bead, giving them better resistance to chipping and scarring. The result is a more durable optics system that returns more light to drivers than typical glass beads. Appropriate pavement marking materials can be obtained from 3M, including both Durable tape (e.g. 3M™ Stamark™ High Performance Tape Series 380I ES) which has distinctive color properties, durability for long-term road presence and superior reflectivity retention, as well as Liquid markings (e.g. 3M™ All Weather Paint and 3M™ All Weather Thermoplastic, which are designed with a microcrystalline bead structure and elements that maximize durability of the optics). Certain embodiments include rare earth elements in the pavement materials, with some of such materials thereby having glow in the dark attributes that improve safety for drivers, while at the same time, being suitable for use with various of the AV systems as described herein.

In one embodiment, the data received and information collected by individual vehicles traversing an area, is communicated to a system such that other vehicles entering such area are able to access such data and adjust their travel routes accordingly. Thus, if a vehicle enters an area where there is a large pothole in the far left lane of traffic, such information is conveyed to a system network. Another vehicle entering into the area where the pothole is located is then forewarned about the pothole prior to hitting it, thus reducing the chances that traffic will be disrupted by such vehicle, if it were not forewarned, hitting the pothole or swearing in to adjacent lanes to avoid the same, thus presenting dangerous road conditions for yet other vehicles in the immediate vicinity. Thus, potholes and debris in the road may be handled by an intelligent automated roadway system in real-time.

Pavement marking materials may further include encoded information, much like smart-cards employ, that include one or more bits of information. An AV on-board sensing system acquires the information when the vehicle passes by the reference markers and thereby determines vehicle position, preferably used in combination with other systems that include optical sensing, radar, and acoustic or video sensing systems. Various embodiments are designed to sense the vehicle's position relative to a desired pathway, usually the center line of the highway. In other preferred embodiments, the pavement marking material includes glass beads on the surface to improve the visibility at night, such as those, for example, described in WO 99/04099 and WO 99/04097, both of which are incorporated herein by this reference.

In certain embodiments, the use of the pavement marking materials as described herein facilitates a method for steering a vehicle by employing magnetic marking elements arranged on pavement markings at predetermined locations. Preferably, an AV is provided with a number of sensors arranged adjacently of each other so that during travel of the vehicle the intensities of magnetic field measured by the sensors provide position information of the AV. In other embodiments, the present invention further provides a system for measuring the position of a magnet relative to a number of sensor elements arranged at predetermined mutual distances, wherein a substantially vertical component of the intensity of magnetic field is sensed by one or more sensor elements during passage there over, and wherein the position of the magnet relative to the sensor elements is estimated on the basis of the signals coming from the sensor elements. One advantage of such embodiments of the present invention is the ability to retro-fit existing vehicles with appropriate sensors so as to read the magnetic pavement markings employed. This provides a way to "grandfather-in" older model vehicles and to make them cooperate with the newest AV vehicles so that a cohesive transportation management system can be employed without having all older vehicles precluded from certain AV lanes. Thus, by employing the use of sensor lane markings or other indicators of the real road, where vehicle sensors preferably detect particular magnetic signals detected from various pavement marking materials, including but not limited to a particular "directionalized" paint or marking, the road geometry values may be estimated based on the actual path the vehicle is travelling. Such a system, in addition to (or supplanting the same) camera sensors and the like, provides a superior AV system and method, which complements other systems, such as knowledge of road design practices and/or on typical physical constraints on certain roads.

Various embodiments of the present invention include the use of a vehicle that may use a plurality of visual sensors to detect positions of surrounding vehicles, as well as a lane-identification system, which can employ infra-red (IR) or other visual scanners. Preferably the system employs a sensor that can receive the signals detected from the pavement marking material as herein described. In certain embodiments, a preferred system employs at least three sensory inputs (GPS, visual sensors and lane-marking magnetic sensors) to provide a combination of location sensors. Based on the information received, a controller may establish a current lane where the vehicle is located and calculate the precise angle the steering system needs to be adjusted in order to steer the vehicle to a predetermined desired path. In certain embodiments, at least one of the sensors employed are located in either a tire or a wheel of a vehicle, with preferred embodiments having lane-marking magnetic sensors located in a vehicle tire or wheel.

Video camera systems that purport to locate road lane markings and road boundaries (under good weather conditions) rely upon the boundary/stripe and the known size of the markings to locate them, and as such, use of Botts dots type (domed, white, disks about 10 cm in diameter) markings suffer from not being able to provide a sufficiently continuous signal. Many of the present embodiments, in contrast, can employ such Botts dots or reflectors, as the ability to detect magnetic directional signals is not dependent upon the visual characteristics relied upon by prior art systems. Moreover, the present system which includes at least one of the magnetic pavement materials—does not suffer the problems experienced with AV systems that employ solely visual systems, such as the effect of motion blur due to a distorted image of the lane marking when the vehicle is moving.

Another aspect of the present invention is directed to the provision of special tires, and in some situations, wheels, of an autonomous vehicle, with such tires/wheels particularly adapted for receiving information, and in certain circumstances, sending information, thus conveying information from the pavement marking materials to the vehicle. Thus, in one embodiment, tires are constructed with particular metal-containing sensing components that are able to recognize magnetic signals emanating from pavement marking materials, such as the particular types of tapes, paints and other structures as set forth herein. As one will appreciate, placing sensors in tires or wheels of a vehicle permits easier retrofits of existing automobiles, and thus facilitates the development of a system that can be employed for autonomous driving vehicles without the need for every vehicle on the roadway to be of a newer design. Thus, many present particular embodiments described herein relate particularly to magnetic sensing systems where a magnetic sensor mounted on or as part of a vehicle is able to detect magnetic signals emanating from predetermined pavement marking materials. Including sensors of various different types in tires and/or wheels, either alone or in conjunction with various visual sensors or camera systems, is a distinct advancement in the cause of establishing a robust autonomous vehicle system that can be widely adopted by numerous users without the need to have brand new vehicles employed on the roadways. Thus, by having a car owner able to retrofit their beloved car with special tires/wheels that can both detect certain signals from the roadway when moving (e.g. regardless of whether such signals are emanating from beacons, in the pavement, overhead, via satellite, wirelessly, etc.) it will be appreciated that the far less expensive and already standardized sizes of tires make them apt for containing later developed sensor systems so as to advance the ability for a substantially uniform AV system to be employed. For example, it is necessary in various AV systems to have vehicles owned by individuals communicate with each other while on a highway. While sensors could potentially be retrofitted to individual bumpers of vehicles to attempt to achieve this goal, the variety of vehicle styles and the different shapes, heights, types and kinds of vehicles that would need to work in concert with each other for such sensors to work in the most advantageous way, is made difficult due to the variety of the above factors that must be addressed in formulating and carrying out such a system. Use of replaceable tires, however, where each tire must contact the same roadway, albeit with several tires being of different widths and diameters, provides the desired consistency for an effective AV system to be implemented in a much more economically feasible manner, e.g. as compared to having every vehicle having to be of a new and compatible design or having to have retrofitable aspects that involve more structural modifications that may affect the overall design and visual aspects of the vehicle. By having tires that are able to facilitate the AV controls necessary to operate an AV system for the public over public highways, makes practical sense as then both wealthy and those more economically challenged can at least retrofit their existing automobiles with sensor systems—embedded at least partially in the tires (and in some situations the wheel that retains the tires) so that the desired communication between automobiles of different types (as well as communications between individual vehicles and the roadway) is made economically feasible and the population of cars/trucks on the highway able to take advantage of AV systems, is greatly increased.

One embodiment is therefore directed to including sensors of various sorts in the tires of vehicles intended to operate on an AV system. Tires, by their nature being replaceable, and that wear down after a time, are perfectly suited to be the one component that individual vehicle owners will not object to purchasing, especially if by doing so they are able to experience the AV system attributes, as discussed herein, by merely retrofitting their existing vehicle. In one embodiment, magnetic sensors are provided in the tires themselves, such tires configured or adapted to read signals emanating from magnetic systems provided in or around a roadway. In particular, certain embodiments are directed to tires with magnetic sensing systems that can detect magnetic signals that are emitted from road positioned elements, preferably magnetic elements that are part of pavement marking materials as described herein. In certain preferred embodiments, lane information is accumulated, computed, and shared by equipped autonomous vehicles traveling on the same road, thus providing an evolving ability to map issues of concern for vehicles and an ability to create detailed and accurate lane information. Certain embodiments employ location histories of AV vehicles to build lane information by tracking nearby vehicle location transmissions. In certain embodiments, individual transmissions are accumulated via use of the magnetic elements located in pavement marking materials and the feedback from such sources by magnetic sensors on AV vehicles. For example, as a vehicle traverses the same road day after day, it accumulates a large number of location indicators as it passes by numerous magnetic pavement markings. Vehicles are adapted to exchange such data so that a history may be formed of all equipped and proxied vehicle travel on a particular roadway. This data can then be used by other vehicles as effective lanes that should closely track the actual lanes but that show how vehicles actually use the road, which is effective for anti-collision purposes. One method of lane identification comprises the following steps. (a) collect data from at least three AV vehicles that travel on a particular road having magnetic pavement marking materials installed thereon; (b) determine traffic lanes of travel from such data in a particular region; (c) assign a lane identification to such region; (d) assign a confidence level to the derived lane identification based on the number of distinct vehicles that made up the underlying data. Reasonable thresholds for a "moderate" confidence rating might be a minimum of 15 different vehicles and no more than 5% of a variance of traffic lanes established via such data so that less than 5% indicates a reasonable degree of confidence that additional vehicles traveling on such roadway will not have significant deviation from determined lane designations.

One aspect of the present invention is directed to electronic systems integrated within a tire structure that employs piezoelectric technology to convert mechanical strains associated with tire flexure to electric charge that is then conditioned and stored in an energy storage device. Sufficient accumulations of such stored energy can then power electronic systems including radio frequency (RF) transmission devices, magnetic sensors, etc. By providing a tire sensing system that is self-powered, no scavenger antennas or multiple receiver locations with additional hardwire connections are necessarily required. Moreover, employing such a tire integrated system for AV purposes presents few limitations in terms of the type and amount of electronic equipment capable of utilization within tire and wheel assembly structures and thus facilitates greater functionality of tire electronics, as more components and/or higher-level equipment may potentially be utilized. In one embodiment, a pneumatic tire assembly with integrated self-powered electronic components comprises a tire structure, an active piezoelectric fiber composite structure, a power conditioning module, and an electronics package. Preferably the tire structure has a crown having an exterior tread portion for making contact with a ground surface, bead portions for seating the tire to a wheel rim, exterior sidewall portions extending between each bead portion and the crown, and an inner liner along interior crown and sidewall surfaces. A power conditioning module may be electrically coupled to the piezoelectric structure to receive electric charge generated within the piezoelectric structure and generate a regulated voltage output. This regulated voltage output then powers the AV sensing systems of the vehicle, and in particular the magnetic sensor that is adapted to read signals from pavement marking materials as set forth and described herein. A piezoelectric fiber composite structure and attached power conditioning module may be adhered to an interior crown surface of the tire, or the piezoelectric structure may alternatively be cured directly into the tire's architecture.

Thus, in one embodiment an active piezoelectric fiber composite, a power conditioning module, a plurality of sensors, a microcontroller, and an RF transmitter are employed. The piezoelectric structure is characterized by a plurality of piezoelectric fibers embedded in an epoxy matrix and provided between at least two electrode layers, such embodiment preferably being either adhered to an interior portion of a pneumatic tire structure or mounted and cured within the tire structure itself. The power conditioning module is electrically coupled to selected electrode layers such that it receives electric current generated within the piezoelectric fibers and stores the current in an energy storage device until it is selectively provided as a regulated voltage output. The plurality of sensors are powered by the regulated voltage output and the RF transmitter is electrically connected to and receives information from the microcontroller to modulate on a carrier signal and, in some embodiments, to transmit to a remote receiver location. Still other embodiments generate power from piezoelectric materials integrated within a wheel assembly. In such embodiments, an active piezoelectric fiber composite structure is incorporated within a selected interior location of the wheel assembly. Such piezoelectric structure is preferably characterized by a plurality of piezoelectric fibers embedded in an epoxy matrix and provided between active electrode layers. When the wheel assembly is subjected to mechanical strain occurring as the wheel assembly rotates along a ground surface resulting in flexure of portions of the wheel assembly, thus generating electric current within the provided piezoelectric fiber composite structure, such generated electric current is then conditioned and stored in an energy storage device such that a regulated voltage source is available for powering electronic devices associated with the wheel assembly, including but not limited to magnetic sensors that detect magnetic signals emanating from the pavement marking materials as described herein.

A sensor system for obtaining data, particularly magnetic data emanating or derived from pavement marking materials as set forth herein, is preferably located within the tire, which has a sensor disposed within or connected to the tire. The sensor system may obtain the data through wireless communications. The sensors are preferably micro-scale or nano-scale and are sufficiently small to be embedded within the tire and are sufficiently small to avoid being an occlusion in the elastomeric material of the tire, and in certain embodiments, may entail a sensor layer that is built into the tire. Other configurations may employ a string-shaped plurality of sensors embedded within or provided as part of a tire component, such as a wheel. Other embodiments include an energy harvesting system that employ a tire or wheel with an electrically conductive coil mounted to the tire/wheel that is adapted to move with the tire/wheel, such that the movement of the coil through a magnetic field induces a voltage in the coil. An energy storage device is preferably then coupled to the coil.

Another aspect of the present invention is directed to a method and system that is adapted to store a map at a computing device associated with a vehicle, wherein the vehicle is configured to operate in an autonomous mode, and wherein the map comprises information about a plurality of roads and a plurality of features, including the inclusion of AV sensing elements necessary for particular AV vehicles to operate, such as roadways having magnetically enhanced features that are adapted to assist in the steering of the vehicles that pass thereon. Preferably the method includes updating the map based on the features of the route and to the quality of driving along the route based on other AV vehicles traveling thereon, such that a cumulative system is developed to assist in having resources directed to a transportation area/region where more sensor technology may be required based on experiences of AV vehicles conveyed across such roadways. For example, in areas where there are insufficient magnets on a pavement marking material or embedded in the roadway itself (due to outages of magnets employed in such pavement markings, damage to the materials, etc), the AV vehicles traveling on such roads would be able to note such deficiencies and send an alert to a system unit such that appropriate repairs can ensue. Thus, there is an adaptive element to the method and system such that additional information is continually provided to assess the safety and efficacy of existing systems and structures, thus ensuring that any breakdown in the AV system along any particular stretch thereof, may be addressed in a timely manner. Indeed, the AV vehicles can wirelessly inform a central system of problems in a particular region so that appropriate repair and avoidance of such issues can be addressed in a prompt manner. Other aspects of such a system may include determining one or more quality control statistics based on the stored information related to the features of the route and to the quality of driving along the route.

One method of the present invention comprises the steps of installing an emitter unit emitting a signal in the pavement, installing a responder unit in an AV vehicle that is adapted to respond to the signal from the emitter unit, with an additional detector unit detecting whether the responder unit is responding to the signal emitted by the emitter unit.

In certain embodiments, glow-in-the-dark pavement marking elements are employed in conjunction with the AV locating features as otherwise described herein. In certain embodiments, luminescent materials are incorporated into the pavement marking materials, whether that be bioluminescent, chemoluminescent, rare earth metals, a combination thereof, or some other material that—especially when contacted by a vehicle running over the surface of such pavement marking material, glows or otherwise luminesceses. Thus, in one embodiment, the surface of a pavement marking material has a layer of chemo-luminescent material that reacts to glow when a vehicle runs over such surface, preferably only if such vehicle is of a pre-determined weight, such as at least about 500 lbs. In other embodiments, the pavement glows after having an AV vehicle's magnetic sensor pass over the pavement marking material, thus creating a light to demonstrate that the pavement marking material and or the magnetic sensor is active and operating. A variety of photo-luminescent pigments can be used in such layers, which can be applied onto standard road marking before or after said standard road marking is hardened. Moreover, various other light diffraction and reflection components can be added to increase the visibility of the pavement marking. Some embodiments of pavement marking material have solar recharging abilities such that the glow-in-the-dark aspects of the pavement marking are recharged by sunlight so as to give off light in the night. Still other pavement marking materials rely upon physical contact by a passing vehicle to trigger luminescence. Preferably, a photo luminescent pigment employed in such pavement marking materials includes chemically doped metal sulfides, alkaline earth metal aluminates or alkaline earth metal silicates that are activated by light and generate a long after glow of light that glows in the darkness for many hours.

In certain embodiments, the magnets embedded in the pavement material are associated with luminescent materials such that when the magnets are attracted to a passing vehicles magnetic sensor, the pavement material glows. This can be achieved in various ways, including positioning and securing magnets in the pavement materials such that the slight movement of the magnets within the pavement material is sufficient to activate the chemical or bioluminescent materials to generate a glow from the pavement material.

In certain embodiments, the magnetic elements embedded in the pavement marking are used in combination with other road detection components, such as a passive RF tag embedded in a paint stripe. A sensor in the moving vehicle thus can emit an RF signal at a frequency to which such tags are responsive such that a return signal is received by the sensor for on-board signaling of the presence of the stripe. In certain embodiments, however, no RF tags are employed.

In still other embodiments, roads can be lined with pavement marking material that includes neodymium magnets or other rare earth element containing magnets (preferably at least about 20 mm in diameter and at least about 10 mm thick; and/or ferrite magnets at least about 30 mm in diameter and at least about 5 mm thick). Such magnets can be held in position in a variety of ways, including being embedded in the pavement marking material, and such magnets being preferably within 5 centimeters from a magnetic sensor associated with a vehicle traveling on the road. Powdered magnets can be used in the pavement marking material, whether it be via inclusion in paint, or provided in grooves formed in the pavement marking material before or after being laid down on the roadway. The magnetic pavement elements can be conformable or non-conformable magnets, including polymeric magnets, ceramic magnets, metal magnets and metal alloy magnets. The magnetic pavement elements can optionally have a plurality of retroreflective beads bonded thereto using an adhesive. Certain embodiments of the present invention relate particularly to road markings which are equipped with materials added to road pavement marking materials that, in addition to possessing a reflection capacity for electromagnetic radiation, may also reflect radiations, such as but not limited to, microwaves and/or infrared radiation, but also magnetic properties that assist in guiding an autonomous vehicle under adverse weather conditions that would otherwise obscure or jeopardize accurate positioning information for such a vehicle.

In certain embodiments, in addition to various of the above referenced attributes, various embodiments are directed to radiation-reflecting road markings that include metal particles having a diameter of between 10 μm and 1 cm, more preferably a diameter of between 0.5 mm and 2.5 mm, which may be of various metal constructs, including copper-containing elements, iron, and metal particles comprising aluminum, magnesium, zinc or an alloy thereof.

Such particles may further have surfaces coated with the metal, glass, poly(methyl methacrylate) or polycarbonate and they may be of various sizes and shapes, including spherical, oval, rounded or of triple mirror format or are in the form of flakes. Preferably, they are provided on a surface of the radiation-reflecting road marking with an adhesion promoter and/or a matrix material of the radiation-reflecting road marking comprises an adhesion promoter, which may be selected from the group consisting of a silane, a hydroxyester, an aminoester, an urethane, an isocyanate and an acid copolymerized with a (meth)acrylate and may be provided in a prefabricated adhesive tape or a water-based paint.

The radiation-reflecting road marking according to claim 1, wherein the metal particles are preferably mixed throughout at least the top first tenth of an inch of the material, but may also have particles situated solely on a surface of the radiation-reflecting road marking.

The present invention also includes a method for producing the radiation-reflecting road marking by, for example, mixing components to form a mixture, applying the mixture to a road surface and adding the metal particles and optionally glass beads during or directly after an application of the plastic to the road surface, preferably when the plastic is still hot or warm or malleable, rather than cold, thus permitting a magnetic force to be employed to cause the purposeful directional orientation of the particles so as to facilitate the autonomous vehicle guidance systems as set forth herein.

Information concerning the static environment of a vehicle includes a stored map in conjunction with a global navigation satellite system (GNSS) such as GPS or Galileo. But a disadvantage with such existing systems is that the location accuracy is not sufficient to guarantee reliable operation of driver assistance systems and autonomous vehicles, especially in view of daily changes to construction, weather conditions, etc. Thus, using the present invention, it is possible to obtain much more precise locations than can be obtained using a local, radio-based or optical location system as described herein.

Existing systems are unable to effectively and consistently recognize traffic lanes reliably in every situation and thus, problems occur in construction sites if temporary traffic markings are being employed; when adverse weather conditions such as fog, rain and snow exist; when the sun is low and there is a lack of contrast between traffic markings, etc. The present invention provides a system and method for reliable automotive systems to have necessary peripheral perception to operate effectively. The road marking embodiments set forth herein are in many embodiments, able to be employed using, with only slight modification, established systems and thus, may be applied with existing techniques without costly additional conversion of the corresponding machines. In preferred embodiments, where the metal particles are mixed throughout the material, rather than being just a surface treatment, the problems associated with wear on a traffic way are addressed, as with wear, new particles are then exposed so that the markings will have a long useful life and will continue to operate as magnetic responsive features for years after first being applied to a roadway. In various embodiments, direct coextrusion of the metal particles as part of an adhesive road tape production process is a preferred mode of application. One will appreciate, however, that in still other embodiments, metal particles may be scattered on during or directly after road marking is applied so that at least another layer of particles are positioned predominantly on the surface, especially if the material is still flexible and able to be oriented by the magnetically directional equipment used to orient such particles after their deposition. In a preferred embodiment, a combination glass bead and metal particle is employed such that the particles added to a roadway marking feature has both light reflective properties as well as the ability to be oriented via a magnetic field at some point after the material is applied to the roadway. This eliminates the need to mix metal particles and glass beads together and instead, provides a single particle component to be used to achieve both functional purposes. One of skill in the art will understand the various ways such glass beads with a metal aspect can be manufactured, but one such particle starts with a metal particle that is then coated with glass, thus producing a glass bead that can then be magnetically manipulated by an exterior magnetic field directed over the roadway marker, thus causing the individual particles to orient as desired due to such magnetic field. This further permits the characteristics of the glass bead reflective capacity to be directed, thus facilitating better reflective attributers of the material, as compared with conventional roadway markings.

To further provide written description and enablement support for the various embodiments of the present invention, the following references are hereby incorporated herein in their entireties by this reference: U.S. Pat. No. 8,818,608 to Cullinane; U.S. Pat. No. 8,989,943 to You; U.S. Pat. Publ. No. 2014/0297116 to Anderson; U.S. Pat. No. 9,268,332 to Montemerlo; U.S. Pat. No. 9,235,211 to Davidsson; U.S. Pat. Pub. No. 2015/0100189 to Tellis; U.S. Pat. No. 9,475,496 to Attard; U.S. Pat. Pub. No. 2015/0166069 to Engelman; U.S. Pat. No. 9,701,846 to Protzmann; U.S. Pat. No. 9,594,373 to Solyam; U.S. Pat. No. 9,547,989 to Fairfield; U.S. Pat. No. 9,834,207 to O'Dea; U.S. Pat. No. 6,217,252 to Tolliver; U.S. Pat. Pub. No. US2011/0159174 to Paul; U.S. Pat. Pub. No. US2007/0116865 to Lichtblau and U.S. Pat. Pub. No. US2005/0286972 to Gongolas; U.S. Pat. No. 8,232,763 to Boot; U.S. Pat. No. 8,315,930 to Littrell; U.S. Pat. No. 8,384,347 to Thomas et. al.; U.S. Pat. No. 8,390,252 to Hooker; U.S. Pat. No. 8,466,656 to Hooker, et. al.; U.S. Pat. No. 8,706,312 to Littrell; U.S. Pat. No. 8,823,330 to Ree et. al.; U.S. Pat. No. 9,030,153 to Littrell; U.S. Pat. No. 9,054,535 to Thomas et. al.; U.S. Pat. No. 9,475,399 to Fontana, et al.; U.S. Pat. No. 9,475,400 to Hooker, et. al.; U.S. Pat. No. 6,650,120 to Krampitz; U.S. Pat. No. 8,624,719 to Klose, et al.; U.S. Pat. No. 8,710,796 to Muller, et al.; U.S. Pat. No. 8,860,366 to Muller, et al.; U.S. Pat. No. 8,886,391 to Bertosa, et al.; U.S. Pat. No. 8,890,473 to Muller, et al.; U.S. Pat. No. 9,024,744 to Klose, et al.; U.S. Pat. No. 9,124,104 to Niemann, et al.; U.S. Pat. No. 9,487,099 to Muller, et al.; U.S. Pat. No. 8,850,226 to Falk, et al.; U.S. Pat. No. 9,227,519 to Heuer, et al.; U.S. Pat. No. 9,283,863 to Eger, et al.; 20180307226 to Chase et. al.; 20200307403 to Rastoll, et. al; 20200298722 to Smolenaers; 20200285246 to Rakshit, et. al.; 20200280216 to Pei; U.S. Pat. No. 10,612,199 to Pratt, et. al.; 20200219391 to Smith, et. al.; 10,823,844 to Arndt, et. al.; 20190250269 to Miu; 20190389314 to Zhu; 20180122245 to Penilla; 20170305273 to Korenaga, et. al.; 20200139830 to Eakins, et. al.; 20190184841 to Van Wiemeersch, et. al.; 20190108698 to Outwater, et. al. 20200350775 to Penilla, et. al.; and 20200251929 to Partovi.

Another aspect of the present invention is directed to reducing the hazards of having pedestrians and bicyclists (as well as other vehicles—whether they are autonomous vehicles or not) provided with special features (herein sometimes referred to as "recognition features") on their apparel, clothing, bicycle or vehicle that permits a particular detection unit on a traveling autonomous vehicle to detect such special feature, and thus, warn the autonomous vehicle's system of the presence of such a feature. As one will appreciate such features can be placed or incorporated into a variety of materials associated with people that may find themselves in an area where autonomous vehicles may be operating. Thus, recognition features may be included in hats, helmets, backpacks, belts, shoes, jackets, etc. For example, in the case of a biker (whether on a motorcycle or on a bicycle) the provision of a magnetic element in the clothing of such biker, positioned preferably at least at the rear portion of the person's clothing or helmet (such as a magnetic feature sewn into the rear-facing portion of a biker jersey, a camelback water pack, a leather biker's jacket, etc.) permits an autonomous vehicle to detect such a feature and thus warns the vehicle of the presence of the biker, thus enabling the autonomous vehicle to do one of the following: reduce speed; stop; change course so as to provide extra room for the biker (e.g. at least another 6 inches, and up to between 1 and 2 feet) when passing, etc. Thus, in various embodiments, the present invention includes wearable features to warn an autonomous vehicle of the presence of a person, bike, static structure, pet, etc. This provides, for example, some assurances for a biker that the autonomous vehicle is at least aware of their presence in a manner that such biker would otherwise assume in the case of a non-autonomous vehicle traveling on the road. It is contemplated in the present invention that such detectable features can be and will be employed in running shoes, apparel, etc. for those who find themselves next to roadways where autonomous vehicles travel, providing both the autonomous vehicle owner and the pedestrians, bikers, cyclists, etc. with increased assurances that undesired collisions will not ensue. As one of skill in the art will appreciate, the dimensions, physical characteristics, etc. of such features can vary to facilitate efficient and economical ways in which to accomplish the objective of having autonomous vehicles detect persons on the path or side of roadways (or traveling in the path of the autonomous vehicle). These may comprise appliques, magnets, stickers, etc. In certain embodiments, such features are purposefully added to the exterior of other non-autonomous (or autonomous) vehicles so that other autonomous vehicles can more easily and readily detect the non-autonomous vehicles while both are traveling down a roadway. Such features can be include, for example, as an attachment to bumpers of vehicles to render it easy for the autonomous vehicle to send or project a signal at about the bumper level of a vehicle and receive a reflected signal that would then be understood to be a warning of the other vehicle within the distance of the signal.

As described herein, an important aspect of various embodiments of the present invention relate to assuring that people, structures, animals, etc., that may encounter an autonomous vehicle have a specially applied feature that either passively or actively projects or reflects a signal back to an autonomous vehicle to announce their presence such that the vehicle's computer system can then adjust its travel in a manner appropriate for such condition, such as by slowing down, speeding up, stopping, turning, swerving, etc. Such maneuvers will obviously be commensurate with what the particular situation presents by the recognition of the applied feature, including for example, the autonomous vehicle pulling safely to the side of a roadway and stopping after a collision with a person, article, etc. that has one or more of the above referenced recognition features associated therewith. Recognition features may also be employed to protect animals, whether they be cats, dogs, cows deer, elk, etc.—and one of skill in the art will appreciate the many ways that appropriate recognition features can be associated with such animals, e.g. dog or cat collars or tags, cow ear tags, tags employed to mark wildlife, etc. Thus, in one scenario, wild deer are tagged with a recognition feature that is specifically directed to either project a signal or to reflect a signal such that an approaching autonomous vehicle can then recognize the animal when within a certain predetermined distance (e.g. 10 ft to 100 ft, more preferably 50 ft-100 t) such that the autonomous vehicle can then be instructed to take appropriate measures to avoid a collision, or to at least lessen the damage that may otherwise be encountered. For example, if an autonomous vehicle is approaching both a person on a bike and a separate wild deer crossing the roadway, the sensors on the autonomous vehicle, in conjunction with computer aided decision making capabilities, can take appropriate measures to attempt to avoid both the person and the wild animal, but if not possible or feasible, will select appropriate maneuvers such that there is a distinction made between the person and the wild animal such that a collision with the person is avoided, even if that entails a collision with the wild animal. Thus, recognition features may be provided with "signatures" as to what the item or person is so that the autonomous vehicle can compute such data and achieve desired maneuvers in view thereof. The ability to associate specifically designed recognition features with various distinct articles, persons, animals, etc. enables the autonomous vehicles, in conjunction with advanced computer systems, to be provided with a type of moral decision making ability, such that the proverbial difficult ethical and moral decisions posed in real life situations where human beings are faced and challenged with decisions as to which of two bad alternatives to select, the autonomous vehicle can at least make a decision based on the input from the roadway situation in conjunction with pre-programmed decision making computer software. Such software can then be updated and adjusted as new situations are encountered that require adjustment of programmed methods of response. Without such a system in place, however, the dangers of having an "unthinking" autonomous vehicle on the roadway may hinder the adoption of this important technology. Thus, intelligent design systems can be incorporated into the autonomous vehicle's computer systems to address such ongoing concerns and several of the references incorporated herein by this reference are directed to such aspects of the present invention.

In various embodiments of the present invention, static structures can similarly be provided with recognition features to enable AV's to "see" them, such that sensors and beacons may be placed on or in existing structures such as light poles, mile markers, road signage, roadway reflectors, roadway paint or marking material, lane dividers, temporary traffic markers, and beneath roadway surfaces.

Sensor and beacon functionality is based on at least one, but may include multiple technologies, including magnetic, RF, visual, infrared, ultraviolet, subsonic, ultrasonic, mechanical, gamma radiation, and short-range radio frequency communication methods.

Acoustic emission (AE) ultrasonic sensors may detect the noise signature of animals or fallen rocks, trees, vehicle accidents, and other potential safety concerns on the roadway. The AE sensors may also detect autonomous vehicles on the roadway and activate beacons to signal the approaching autonomous vehicle of any potential threats to travel on the roadway ahead so the autonomous vehicle can take appropriate evasive action.

The magnetic paint applied to the roadway surface preferably has distinctive characteristics allowing differentiation between the outside edges of the roadway, parallel traffic lane divider markings, and identification of opposing traffic lane markers. The autonomous vehicle may be able to discern the type and proximity of the various magnetic signatures of the different roadway markings to assist in navigating the path of the roadway even when the roadway surface is covered by rain, ice, snow, sand, or other material.

RF tags may also be attached to roadway signage including mile markers, stop signs, yield signs, guardrails, light poles, and lane dividers. An autonomous vehicle in close proximity to any RF tag may sense the type of signage the RF tag is attached to in order to assist in navigation of the vehicle. RF tags may be attached to temporary roadway barricades and hand-held signage or flags to direct the motion of autonomous vehicles around and through construction zones.

Piezoelectric elements may be installed in or under the roadway surface in appropriate locations to maximize the probability of vehicle tires to pass directly above the piezoelectric elements. Piezoelectric elements possess the ability to create a voltage when compressed and relaxed, such as when a vehicle tire passes over the element. This voltage may be used to power or initiate the operation of roadway beacons such as lane divider lights installed in the roadway, roadside lighting, acoustic speakers, ultraviolet signals, ultrasonic emitters, and short range radio frequency generators. Piezoelectric elements may also monitor the condition and mechanical integrity of the roadway surface itself. Potholes, severe cracks, and severe deformations in the roadway surface may be detected by the piezoelectric elements and suitable beacons may be activated by the piezoelectric elements to alert oncoming autonomous vehicles of roadway deficiencies and assist them in navigating safely around the roadway anomalies.

On roadway surfaces that are not suitable for other types of navigational aids, such as magnetic paint to identify traffic lanes on the roadway surface over steel bridges, piezoelectric elements may be installed between lanes, at the edges of the roadway, and between opposing lanes of traffic where the magnetic paint would have been installed on other roadway surfaces. The piezoelectric elements may detect vehicle wheels over or near these lane boundaries and trigger the operation of suitable beacons to communicate with the autonomous vehicle allowing it to stay in appropriate traffic lanes.

The various beacons may alert an autonomous vehicle of changes in the roadway path during periods of inclement weather such as snow, water, or ice on the roadway surface and assist the autonomous vehicle in navigating the roadway path successfully and safely. Some beacons, such as an ultrasonic beacon, may have the purpose of alerting nearby wildlife of an approaching vehicle allowing them to escape danger. Other beacons may alert traffic control monitoring personnel of local traffic accidents or severe congestion so that appropriate measures may be implemented to improve traffic flow.

AV vehicles are the future of mobility across the globe and are expected to touch the lives of every person of all ages. But this comes with certain challenges regarding safety, reliability, cost, legal framework, regulations, etc. however, of all the concern safety and reliability are of utmost importance for researchers and engineers. One aspect of the present invention is directed to autonomous vehicles in a work zone on highways—where there is a need to direct traffic, and especially AV traffic, where the conventional pavement markings are not instructive of how traffic should flow. The work zone is one of the most challenging areas for the autonomous vehicle to drive from. This is because the work zones are very dynamic, and all the construction activities are specific to the site condition and cannot always be predefined. The present invention permits pavement markings to be used for smooth movement through the complicated work zone. Using the pavement marking materials as described herein, autonomous vehicles can rely on the special pavement markings for smooth movement through the work zone.

Radio frequency identification (RFID) is a technology that wirelessly detects and responds to electromagnetic signals. RFID consists of three main components: (1) transponder, (2) reader, and (3) antenna. Transponders contain unique information stored in a microchip. Usually, the transponder is passive when it is not within the interrogation zone created by the reader. When the reader supplies the power necessary to activate the transponder in an interrogation zone, the transponder is activated. The reader usually consists of a radio-frequency modulator (transmitter and receiver) and a control unit. The reader also includes a system to communicate data to the computer or other system. Both transponder and reader have antennas to establish communication.

RFID can be divided into two main classes, based on how the energy supply of the transponder works: active or passive. Active transponders have their own energy supply in the form of a battery or solar cell. A built-in power supply increases the range of the system, as the tags do not depend solely on the electromagnetic field created by the reader to be activated. In addition, signals can be transmitted even when they are not in the reader's range. Active tags can also have additional sensing capability, as well as operate in harsh environments. By contrast, passive transponders do not have any power-supply source, which increases their flexibility and longevity. The reader's electromagnetic field provides the energy for operating the transponder and sending the data. If the transponder is outside the reader's range, the transponder is not able to send a signal due to a lack of power.

In addition to tag type, two approaches are based on the power transfer from reader to tag: near-field RFID and far-field RFID. Both approaches transfer power to a remote tag to sustain the operation of the tab, using electromagnetic properties associated with radio-frequency antennas. Far-field operates on frequencies greater than 100 MHz and typically in the ultrahigh frequency (UHF) range (such as 2.45 GHz). The domain of near-field coupling is below these frequencies.

Near-field coupling is based on Faraday's principle of magnetic induction. A reader passes an alternating current through the coil to generate an alternating magnetic field around it. As the tag approaches this alternating magnetic field, an alternating voltage is induced in the coil of the tag. When such alternating voltage is rectified and stored in capacitor, a charge reservoir that powers the tag chip is created. Current flow in the tag coil creates a small magnetic field around it that opposes the reader's field. Because the current is proportional to the load applied to the tag's coil, the process is known as load modulation. By encoding the signal as small variations in the magnetic field of the tag coil, the reader can recover the signal and detect the tag ID.

Far-field coupling uses electromagnetic waves from a reader's dipole antenna. The tag receiver captures the energy as alternating potential difference between the arms of the dipole antenna. A diode rectifies this potential and stores it in a capacitor. After enough energy is accumulated, the stored energy is used to power the electronics. The process of backscattering is used for communication, as the tags are beyond the range of the reader's electromagnetic field. The antennas are designed with precise dimensions and are tuned to a particular frequency to absorb most of the energy at that frequency.

RFID has significant potential due to the development of inexpensive radio receivers and decreases in the power requirement for the tag at a given frequency as a result of the shrinking feature size of semi-conductor manufacturing. The lower power requirement also helps in reading at greater distances. A typical far-field reader interrogates tags that are 3 m away, with some companies claiming a 6-m range.

There are some limitations of near-field and far-field coupling. The range of operation is limited by the frequency and amount of energy received by the tag, as well as the sensitivity of the radio receiver to the received signal. Signals are attenuated at a higher rate when the distance increases. Moreover, for automotive applications, there are challenges of reading collocated tags, debris or metal interference, difference in stationary and in-motion reading conditions, and the presence of water or snow during adverse weather conditions.

Communication between infrastructure and vehicles is important for successful deployment of autonomous and connected vehicle at a large scale. However, current infrastructure does not provide assistance for the vehicles to control, guide, and navigate safely and efficiently if inclement weather occurs or primary navigation features fail. The physical infrastructure should be modified so that sensors in autonomous vehicles can detect the roadway and roadside in a way that improves the safety of the vehicle under all conditions.

In the specific case of pavements, the control, maneuver, and lateral positioning information can be delivered to the vehicle by modifying pavement's material properties or by using passive sensors. Magnetic, conductive, thermal, and optical properties of the pavement can be modified to assist in safe navigation by placement of aggregates with distinctive dielectric and magnetic properties. By contrast, passive sensors do not require extra electric power; and they can be embedded in the pavement to be interrogated by readers on the AVs. For instance, sensors such as passive RFID can be embedded to provide an extra layer of safety during adverse weather conditions such as heavy rain, fog, and snow. These modifications can be implemented during construction of new roads or while retrofitting existing pavements.

Aggregates influence most of the paving material's properties. In conventional pavements, aggregates with same properties are used throughout the depth and width. Strategic modification of pavement by placement of aggregates with certain dielectric or magnetic properties can create a signature (e.g., electromagnetic or thermal) that can be read by autonomous vehicle sensors to find the edge or center of the road. Detection of pavement boundaries can help in lateral positioning CAVs during driving. In addition, systematic location of such signatures during pavement construction also reduces the computational effort to detect road boundaries. These modifications can be implemented during the construction of new pavement, whereas existing pavements can be milled and filled with appropriate material to provide the distinctive properties that are different from those of standard paving materials. Distinct materials can be placed on either the boundary or the center of the lanes.

Various approaches can be adopted for modification of electromagnetic properties in pavement such as (1) use of aggregate with distinct electromagnetic properties such as steel; (2) use of steel-fiber-reinforced concrete; (3) electrification of rebars in some pavement types, such as continuously reinforced-concrete pavements; (4) use of magnetic epoxy; and (5) installation of thin metallic strips or magnetic tape embedded in the pavement that creates an eddy-current effect to provide the electromagnetic signature that assists in vehicle maneuvering.

The electromagnetic property can be detected by radar. Alternatively, eddy-current technique or magnetometers can be used, which are potential future sensor for CAVs. Array of multiple sensors at different widths of the vehicle could be used to receive the signal from the modified material. Locations with a distinctive electromagnetic material reflects higher energy or affects magnetic field around it, as compared to normal pavement material. Using the eddy-current method creates a varying magnetic field that induces eddy currents in materials such as magnetic epoxy or other electromagnetic material embedded in the pavement. The higher reflected signal or the disturbance of the magnetic field helps to localize a vehicle upon the pavement.

Optical properties of the pavement can be also changed to help the vehicle maneuver safely and determine its lateral position in the lane. Transparent/translucent concrete mix or epoxy can be used strategically to help the vehicle. A notch can be made and filled with transparent/translucent concrete that allows light to pass through. Lidar or laser device array can be used to determine the location by measuring the depth from the vehicle to the pavement surface.

Similar to its electromagnetic and optical properties, pavement's thermal properties can be used to determine the location of a vehicle. Strategic location of the aggregates with different thermal diffusivities can help to distribute the heat at different rates throughout the pavement. The heat map can be identified by a thermal camera to determine the location of the vehicles.

Specifically, asphalt concrete (AC) and Portland cement concrete (PCC) have different thermal diffusivities. This difference can be exploited to create a thermal pattern composed by a patch of asphalt along the boundaries of a concrete pavement. The resulting heat map can be used to enhance CAV navigation. The difference in thermal properties is also helpful when it is snowing and before the temperature of the pavement equilibrates. However, when the temperature of the pavement reaches a constant, for instance after a long winter, the heat map would not be able to differentiate between locations with different thermal properties.

A sensor that does not require any external source of power would be optimal for vehicle and infrastructure communication. In addition, sensors that actively broadcast messages during adverse climatic conditions such as snow or heavy rainfall could also be mounted on roadside infrastructures like stop signs or traffic lights to enhance the safety of CAVs.

Passive RFID sensors embedded in the pavement can store information about the surrounding location to help CAVs navigate. The RFID sensors can have tags that read certain value, which can correspond to any particular method of determining the location of a vehicle in the transverse direction.

As most of the pavements are of standard width, such series of RFID can be mass produced with standard information stored and arranged in a sticklike fashion. The arrangement can be embedded in the joints or notched sections of pavements, which can be sealed after installation. When conditions become adverse, the vehicle can interrogate the RFID sensors by creating an influence zone.

Adverse environmental conditions are among the main factors preventing the massive implementation of CAV for all roadway classifications and geographic locations in the United States. Magnetic and conductive properties modification of some existing infrastructure materials, such as aggregates, rebars, and fibers, can make specific regions in the pavement more identifiable beyond current optical camera techniques (e.g., lane edges). Modification based on optical properties can be implemented not only on new pavements but also on existing ones by milling and pouring epoxy. Potential issues that would cause technology not to function would be excessive snow and ice on the road. Asphalt concrete and Portland cement concrete are widely used infrastructure materials with different thermal diffusivities and reflectance properties. The difference can be exploited, so that a specific road region, such as the centerline, can be detected easily by its temperature and rate of temperature change.

RFID can provide communication during adverse weather conditions like heavy rainfall or snow. In addition, RFID saves computational power; and CAV can provide power to passive sensors inside the pavement. These benefits would have to overcome the extra construction cost and maintenance.

With the above principles and embodiments in mind, one preferred embodiment of the present invention is directed to a method for charging an autonomous electric vehicle designed to traverse public highways (as opposed to vehicles used inside warehouses, etc.) where the AV detects, using a RFID tag reader associated with the autonomous electric vehicle, signals emanating from a road marker positioned on a road. It will be understood that a "road" is used to describe generally the surface upon which the AV traverses and includes, for example, the surface of a charging kiosk that includes electric sources of energy to recharge depleted AV batteries. The road marker comprises pavement marking material applied to a roadway surface and is adapted to reflect at least two of the following signals: visible light, laser from a lidar; and a radar signal. The road marker includes at least one or more RFID tags. Preferably the road marker comprises a raised pavement marking material that includes a top surface and a bottom surface opposite the top surface, and two opposing angled side surfaces adjacent the top surface and bottom surface, with the at least one or more RFID tags included in said raised pavement marking material. The method includes detecting the at least one or more RFID tags using the RFID tag reader associated with the autonomous electric vehicle. Preferably the RFID tag reader is positioned on one of the autonomous electric vehicle, a tire, or a wheel of the autonomous electric vehicle. This method enables accurate lane marking recognition so as to properly position the AV vehicle at the charging kiosk, despite weather conditions where the road may be covered by snow that would interfere with the AV's proper positioning for charging purposes. The autonomous electric vehicle will have at least one rechargeable battery and employs a computer-implemented method to locate a kiosk having a receptacle slot for charging the rechargeable battery of the autonomous electric vehicle. The computer-implemented method involves a request for a geographic location of at least one kiosk location proximate to the geographic location of the autonomous vehicle. The autonomous electric vehicle is instructed to proceed to the at least one kiosk where the at least one receptacle slot integrated in the autonomous electric vehicle is connected to an electric power source at the kiosk to recharge the battery of the autonomous electric vehicle. In preferred embodiments, the AV is guided to the kiosk by detecting at least one or more RFID tags in the pavement marking material.

One will appreciate that this summary of the invention is not intended to be all encompassing and that the scope of the invention and its various embodiments, let alone the most important ones, are not necessarily encompassed by the above description. One of skill in the art will appreciate that the entire disclosure, as well as the incorporated references, pictures, etc. will provide a basis for the scope of the present invention as it may be claimed now and in future applications. While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention. Those skilled in the art will appreciate that the conception, upon which this disclosure is based, may readily be utilized as a basis for designing of other structures, methods and systems for carrying out the several purposes of the present invention. It is important, therefore, that the claims be regarded as including any such equivalent construction insofar as they do not depart from the spirit and scope of the present invention.

DETAILED DESCRIPTION OF PREFERRED EMBODIMENTS

Figure 1:
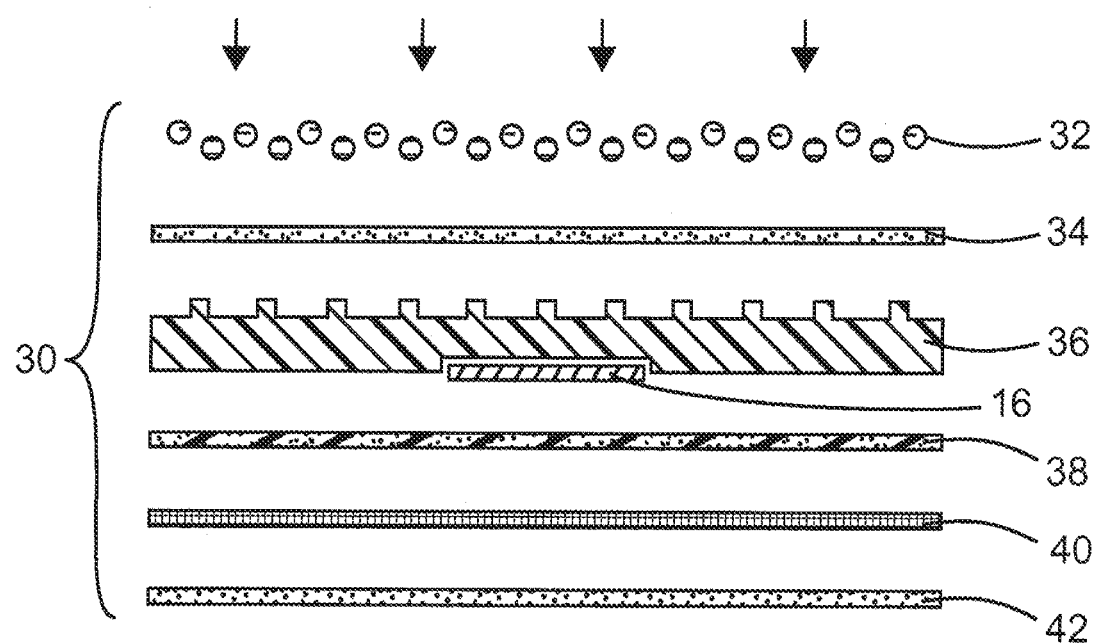
FIG. 1 is an exploded, cross-sectional view of one embodiment of pavement marking material having rare earth element magnetic material included, as well as other potential materials, including RFID tags embedded in the pavement marking material. The pavement marking material includes several layers of materials.

Certain embodiments of the present invention are directed to the charging of an electric autonomous vehicle that is itself guided to a charging station via certain pavement markings. As illustrated in the figures, e.g. FIG. 6, the charging port 17 will typically be the charging outlet on the vehicle that will receive a connector that couples to power. In a home configuration, the receptacle can be provided with a connection to the power grid of the home. The receptacle is then connected to the charging port 17 of the vehicle when charging of the vehicles main battery 14 is desired. To guide the AV to charging stations or kiosks, several embodiments involve the use of pavement markings that permit unprecedented sensor feedback such that adverse weather conditions do not pose the problems presently experienced by self-driving systems presently employed. Having pavement markings that incorporate, for example, magnetic or RFID aspects that can be detected by sensors located in or on a vehicle offers the desired redundancy required to ensure a safer and more robust system that facilitates self-driving and steering mechanisms and systems for autonomous electric vehicles such that they can be efficiently charged prior to their batteries being fully drained of power.

Obtaining charge for an AV may include plugging the vehicle into a charging receptacle so as to charge the native battery of the vehicle, which can be done robotically or by the occupier of the AV when at the charging station. In certain embodiments, obtaining charge to an AV can also include refilling on volt bars to replenish volt bars that have been used during the vehicle usage. In other embodiments, charge can be transferred to the AV vehicle wirelessly (e.g., without plugging in an outlet or receptacle). Examples can include a transfer surface that the vehicle parks over, and the charge can be transferred wirelessly to the vehicle via conductors on the underside of the vehicle. The vehicle can simply park in the slot and once payment is made, the charge can start to flow capacitively or wirelessly to the electric vehicle. Directing the AV to the electric charge kiosks can involve the use of the pavement markers as more fully described herein that involve RFID and/or magnetic aspects that can be sensed by the AV and therefore properly positioned to obtain a charge, and then exit the charging kiosk after receiving a full charge of deleted batteries.

It should be understood that in preferred embodiments, charging of the AV is performed in accordance with an "EV Charging Standard" defined generally by standards set forth as follows A-E, and incorporated herein by this reference:

Combined Charging System 1.0 Specification—CCS 1.0 (Version 1.2.7 (2017-01-26));

Bharat EV Charging Standards AIS-138 (Part 1 and Part 2);

CHAdeMO published as IEEE Standard 2030.1.1TM-2015;

The GB EV Charging Standards including GB 18487.1-2015, GB 20234.1-2015, GB 20234.2-2015, GB 20234.3-2015, GB 27930-2015, Q/GDW 397-2009, Q/GDW 398-2009, Q/GDW 399-2009, Q/GDW 400-2009 and GB/T 18384.3-2015; or SAE J1772, IEC 62196-1:2014, IEC 62196-2:2011, IEC 62196-3:2014, IEC 60309, IEC 61851-1 Ed 2.0: 2010, IEC 61851-1 Ed 3.0: 2017, IEC 61851-21:2014, IEC 61851-21:2017, IEC 61851-22, IEC 61851-23:2014, IEC 61851-24:2014, ISO 15118-1:2013, ISO 15118-2: 2014, ISO 15118-3:2015, DIN Spec 70121:2014-12, SAE J2847/2, ISO 6469-3, and ISO 17409:2013-09.

The foregoing standards include all standards referenced to be used in their implementation whether implemented independently or in combination. For example, with respect to the standard in "E"—SAE J1772, —The SAE J-1772 committee develops connector standards for plug-in vehicles in the US. The J-1772 Standard comprises three levels . . . IEC 61851 promotes different charging levels analogous to SAE J1772.

IEC 62196-1:2014—the IEC International Standard 62196-1 (2014) defines the general requirements that apply to plugs, socket-outlets, vehicle connectors, vehicle inlets and cable assemblies for electric vehicles, incorporating control solutions and having a rated voltage. IEC 62196-2: 2011, IEC 62196-3:2014, IEC 60309, —plug/socket type IEC 60309; IEC 61851-1 Ed 2.0. Standards like ISO/IEC 15118 and IEC 61851-1 are developed to ensure base level interoperability of front-end communication and signaling processes for smart charging between electric vehicles and charge spots.

2010, IEC 61851-1 Ed 3.0: 2017, IEC 61851-21: 2014, IEC 61851-21: 2017, IEC 61851-22, IEC 61851-23:2014, IEC 61851-24:2014, ISO 15118-1. The ISO 15118 standard shows the potential of this future-proof charging communication protocol used for integrating electric vehicles (EVs) into the smart grid.

2013, ISO 15118-2: 2014, ISO 15118-3: 2015, DIN Spec 70121. DIN SPEC 70121 describes the Communication for DC Charging between Charging Station and an Electric Vehicle. 2014-12, SAE J2847/2. The SAE J2847/2 standard establishes the application layer specifications and requirements for DC charging.

ISO 6469-3, ISO 6469-3:2001—Electric road vehicles—Safety specifications—Protection of persons against electric hazards 90.92 ISO 6469-3.

ISO 17409:2013-09, in accordance with new standards for DC-charging (ISO 17409).

In one embodiment, a method is set forth that enables the charging of an electric autonomous vehicle employing rechargeable batteries. The electric AV vehicle has at least one receptacle slot integrated in the AV that provides for a connection to a power source for providing power to an electric motor of the electric AV vehicle. When the AV vehicle's battery charge is low, the vehicle employs a computer-implemented method to locate a kiosk or charging station. Such kiosks have receptacle slots for one or more of holding, charging and/or dispensing batteries. In preferred embodiments, the AV is charged at the kiosk via the computer-implemented method that involves a request for a geographic location of at least one kiosk location proximate to the geographic location of the AV.

The method further involves the employment of accurate lane marking recognition despite weather conditions on the road. Thus, AV vehicles can be guided to electric charging kiosks despite roads being covered by snow by following the following steps: detecting, using a magnetic sensor, magnetic signals emanating from magnetic road markers positioned on a road, the magnetic road markers comprising pavement marking material applied to a roadway surface. The pavement marking material is adapted to reflect at least two of the following signals: visible light, laser from a lidar; and a radar signal. In certain embodiments, the magnetic road markers present a magnetic signal and are adapted to be positioned substantially in the center of the roadway upon which the AV travels. The road markers preferably include one or more rare earth magnetic components or at least one or more RFID tags. Preferably the road markers comprise a raised pavement marking material that includes a top surface and a bottom surface opposite the top surface, with at least one of the one or more rare earth magnetic components and/or the at least one or more RFID tags included in the raised pavement marking material. The AV vehicle detects the at least one or more RFID tags using an RFID tag reader associated with the AV vehicle. The RFID tag reader and/or the magnetic sensor is positioned on the vehicle to effectively read where the pavement markings are positioned so as to properly guide the AV into a charging position at the electric charging kiosk. In preferred embodiments, power is provided to the road markers by solar charged batteries embedded in the road markers. To avoid the damage that can be caused by insects that may be attracted to the road markers, certain embodiments have the road markers include pesticides. In still other embodiments, the RFID tag reader is positioned on one of the vehicle, a tire, or a wheel of the AV vehicle. In certain embodiments, the pavement marking material includes a thin-film conductive material that conducts one of an AC or DC current. In still other embodiments, the RFID tag reader is powered by at least one piezoelectric power generation system associated with at least one wheel or tire of an AV vehicle.

With respect to road or pavement markers that interface with electric AVs, in various embodiments, as described above and as illustrated in the figures, a first layer of a pavement making may consist of a layer of glass beads. The glass beads are adhered to a textured rubber base 36 by a layer of adhesive. Inside the textured rubber base 36 there is a recess for receiving an RFID tag. The RFID tag is then held in place by a fiberglass netting and a layer of adhesive. The fiberglass netting also provides strength to the pavement marking material. Lastly, there is a layer of adhesive for adhering the pavement marking material to a road. Alternatively, the layer of glass beads and layer of adhesive may be substituted with Diamond Grade™ High Intensity Prismatic Sheeting, Series 3930, commercially available from 3M Company based in St. Paul.

In certain embodiments, a raised pavement marking material is employed that includes a top surface and a bottom surface opposite the top surface, two opposing angled side surfaces adjacent the top surface and bottom surface, with such surfaces being suitable for a magnetic component on one side and an RFID tag on the other side. The angled side surfaces are designed to help optimize the readability of the RFID tag by a RFID reader mounted on a vehicle, but in a manner that does not significantly interfere with the reading of the magnetic components on the pavement marking material.

Retroreflective sheeting may overlay the RFID tag and/or magnetic components. In a preferred embodiment, a retroreflective sheeting is non-metalized (i.e. prismatic), retroreflective sheeting. One suitable non-metalized reflective sheeting is commercially available from 3M Company based in St. Paul as Diamond Grade® High Intensity Prismatic Sheeting, Series 3930. Another example of non-metalized, retroreflective sheeting is described in commonly-assigned U.S. Pat. No. 4,588,258 to Hoopman, incorporated herein by this reference. A cube-corner retroreflective sheeting can be used that utilizes a nonmetalized material, and it may be used for retroreflective sheeting of raised pavement marking material placed in front of an RFID tag without inhibiting the transmission of radio signals.

In one embodiment, the pavement marking material is able to communicate with the tire containing elements by remaining in the traditional place of line lane barriers. In another embodiment, the lane lines have an extra non-painted element that extends until the tire runs directly over it so as to reduce the need for the power of any signals being communicated to extend in a lateral direction between the vehicle and the lane marking. In either event, the traditional road construction design and well-known lines, colors, etc. are preserved as there will be traditional cars and trucks running on such roads along with the AV vehicles. While separate lanes for AV vehicles may make sense, in terms of a system that can best work with all vehicles being largely the same in terms of certain functional and structural components, it would be most preferable to have a system where both non-AV and AV vehicles co-exist. Having the road and vehicles that exist today readily retrofitable by the ways as described herein is a start, as replacing tires is something all vehicle owners are accustomed to and is the best simple prospect for transforming a driver system to a driverless system with the minimum of disjunction and confusion. Other embodiments of the present invention relate to inclusion of various other position determining elements in a vehicles' tires and/or wheels, hubcaps, etc. such that a vehicle owner can retrofit their existing vehicle with the latest versions of updated hardware and software compatible systems to facilitate system wide AV objectives. Thus, in certain embodiments, the sensors encompassed in such tire/wheel embodiments may include those that detect and communicate between separate vehicles on a roadway, such that at least one tire/wheel-containing sensor communicates with at least another tire contained sensor in a neighboring vehicle so as to at least determine and retain minimum distances from each vehicle under driving conditions.

Other embodiments are directed to variously configured raised pavement marking material that include a magnetic component 16, which can also include an RFID tag, glow in the dark material, etc. The pavement marking material may include a top surface and a bottom surface opposite the top surface. The raised pavement marking material also includes in certain embodiments two opposing angled side surfaces adjacent the top surface and bottom surface. Other embodiments include a multi-grooved top surface such that reflective aspects of both light and magnetic field sensors can benefit from the directionality of the grooves. In certain embodiments, in addition to an RFID tag, a rare earth element is mounted on the top surface. Alternatively, the magnetic components as well as an RFID tag may be within the body of the pavement marking material so long as both the magnetic element and the RFID tag is still readable respectively by a magnetic sensor located on a vehicle (preferably in its tires or wheels) and/or by a RFID reader. In certain embodiments, to facilitate a cost effective way to implement an overall AV vehicle system a magnetic sensor is included in less than all the tires or wheels of a vehicle. In some embodiments, only one magnetic sensor is employed and is mounted in a position such that it can read the magnetic field emanating from the pavement marking materials. In one preferred embodiment, the magnetic sensor is incorporated into one single tire or wheel of a vehicle, and preferably the front tire/wheel that is closest to the pavement marking material when the vehicle is moving forward (so the front, left hand drivers side of the vehicle in the US). In other embodiments, especially for redundancy reasons, at least two tires/wheels include magnetic sensors, preferably on the back left hand side in the US for vehicles. In still other embodiments three tires/wheels are fitted with such sensors, in other embodiments all four tires/wheels (of a standard car) are fitted with such sensors. One will appreciate that the addition of RFID tag readers can also accompany the magnetic reader in the same locations as the magnetic readers on the vehicle, or in disparate positions. Preferably, both RFID tag readers and magnetic readers are at least partially powered via the piezoelectric system employed in the tires/wheels of vehicles having such systems.

The pavement marking material may be made of plastic or other suitable materials. Preferably, if the magnetic materials and/or RFID tags are embedded within the pavement marking material, then the markers are positioned and shielded so as to reduce the interference that may occur with respect to the readability of the RFID tag. The magnetic element including pavement marking material may be attached to a road by an adhesive or double sided tape, as is well known by those skilled in the art.

In various embodiments, a lane position detection system includes, in addition to at least one magnetic containing element that can be read by a reader positioned on at least one left hand side of a vehicle, preferably near or on a tire/wheel of such vehicle, one or more RFID tags are also positioned at stationary locations along a traffic lane, preferably as part of a pavement marking material as set forth herein, and an RFID reader is positioned and oriented on a moving vehicle, preferably in a different position from the magnetic reader (so as to avoid interference that may exist n the readers functioning properly if brought too close together) such that the vehicle can detect the traffic lane when the RFID reader receives a response from at least one of the RFID tags.

A particularly preferred embodiment of the present invention is directed to a method and system that includes: a magnetic component placed on or in pavement marking material, thus providing a low cost, systemic structure that, even if used in combination with cameras and other vision systems, assures that existing vehicles can be retrofitted with relatively low cost systems, such as magnetic readers that are powered by power producing systems contained in tires or wheels that can be readily added to existing vehicles, thus making such existing vehicles suitable for use in an overall AV vehicle system so as to enjoy the numerous benefits (as set forth herein). Camera systems are considered as necessary but on their own, insufficient to accomplish the above referenced objectives of a safe and efficient AV system. There will necessarily be a time period of transition where the road must be shared by both old fashion cars and AV vehicles. Thus, preferably there needs to be a system devised to permit both to operate on the same road—and the present invention provides such a system. Replacement of pavement markers (either tape or paint or Botts, etc.) is already standard procedure—and thus, replacement with "better-smarter" pavement markers would be a good start at transforming roads to facilitate an AV vehicle system. Traditional vehicles (cars and trucks and busses, etc) would preferably be able to be retrofitted with an AV sensing capacity. The easiest way to modify cars is to integrate such new components into some feature of a vehicle that is traditionally changed out every so often—and that does not significantly impact the look of the vehicle: tires or wheels. Thus, putting special features in tires to transform a regular vehicle into an AV vehicle is a preferred way to proceed with introducing a viable and cost effective AV system for the public good. Preferably, a magnetic system is installed into pavement markers—either paint, Botts, more substantial markers, etc. Thus, "new" lines in the center of lanes (or under the tires themselves) would not necessarily have to be provided (so that roadways will retain the old look and feel we the public are accustomed to). To get a robust magnetic signal from a pavement/roadway marking running down the center (and preferably also the side) of a highway—one preferably must get very close to the magnet—and/or employ a powerful magnet. Better magnets are now available by using Rare earth elements—and if one employs tires—which all necessarily have to contact the ground in close proximity to the pavement markers (preferably about 12-18 inches away)—and the power to run an AV system being attained using piezoelectric components in tires/wheels to provide power for an AV system that senses the magnetic signals from the roadway/pavement markers, thus permitting one to avoid the increased energy demands that the proposed camera systems entail.

Therefore, with a magnetic lane system as described—readily attainable via routine road maintenance using traditional practices (and just better pavement markers—e.g. ones having magnetic features) and the use of compatible tires that have magnetic sensors to read the pavement markers—the present invention provide the "something extra" required for AV vehicles to be dependable, and able to navigate with less camera and radar features, etc. The retrofitability of such a system—from pavement marking elements to tires for traditional vehicles—in order to have a more cohesive and uniform system—especially where AV vehicles converse and signal between each other and with the same road surface—may achieve and accomplish the objective of a smoother transport system devoid of human error—made possible and attainable via the present invention.

With reference to FIG. 1, one of skill on the art will appreciate the many variety of materials and layers that can be produced to generate a suitable pavement marking material to accomplish the objectives of the present invention as set forth herein. In certain preferred embodiments, however, a rare earth metal magnet 16 is provided in the center region of a pavement marking material. Other suggested layers of the pavement marking material 30 may include: glass beads 32, adhesive 34, a plastic or rubber base 36; an adhesive layer 38; fiberglass or composite netting 40 and a road surface adhesive 42. In addition, an RFID tag may be positioned in roughly the same position and layer as the magnetic element 16, and in certain embodiments both an RFID tag and a magnetic element 16 are both employed.

Figure 2:
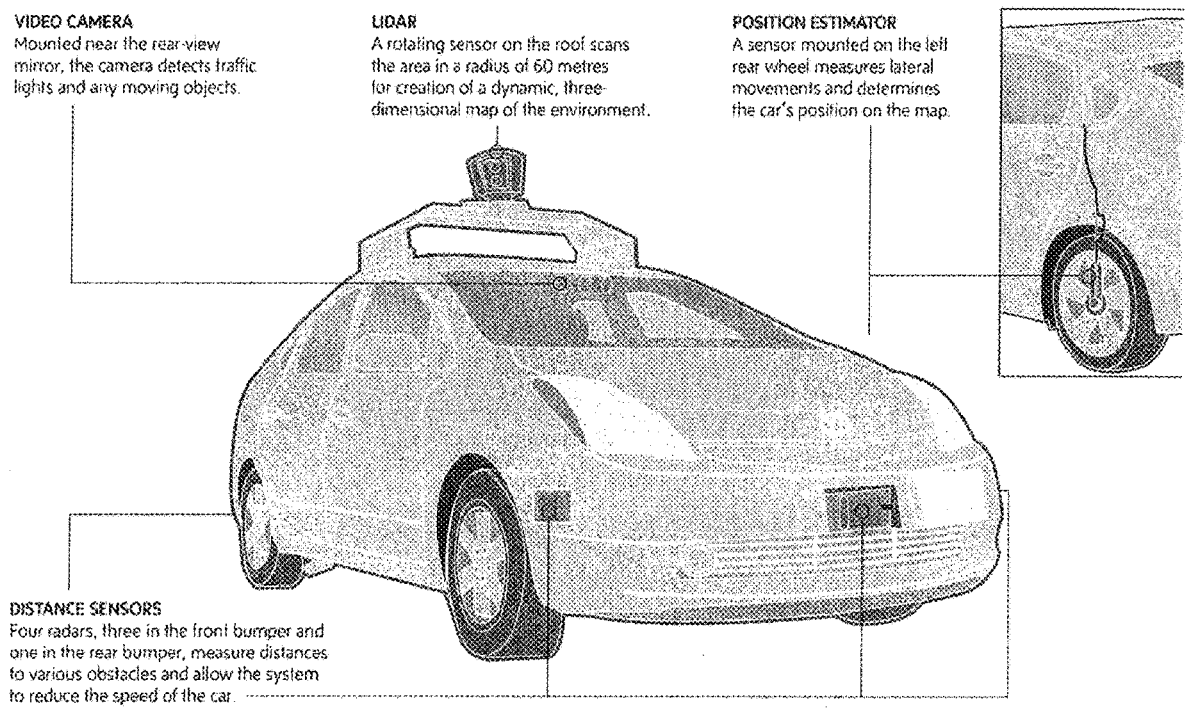
FIG. 2 illustrates various sensor system that can be used in conjunction with the present magnetic pavement marking system, where a magnetic sensor is provided on at least one position near at least the left front side of a vehicle and powered by a piezoelectric system associated with at least one of the wheels of the vehicle.

FIG. 2 illustrates various sensor system that can be used in conjunction with the present magnetic pavement marking system, where a magnetic sensor is provided on at least one position near at least the left front side of a vehicle and powered by a piezoelectric system associated with at least one of the wheels of the vehicle.

Figure 3:
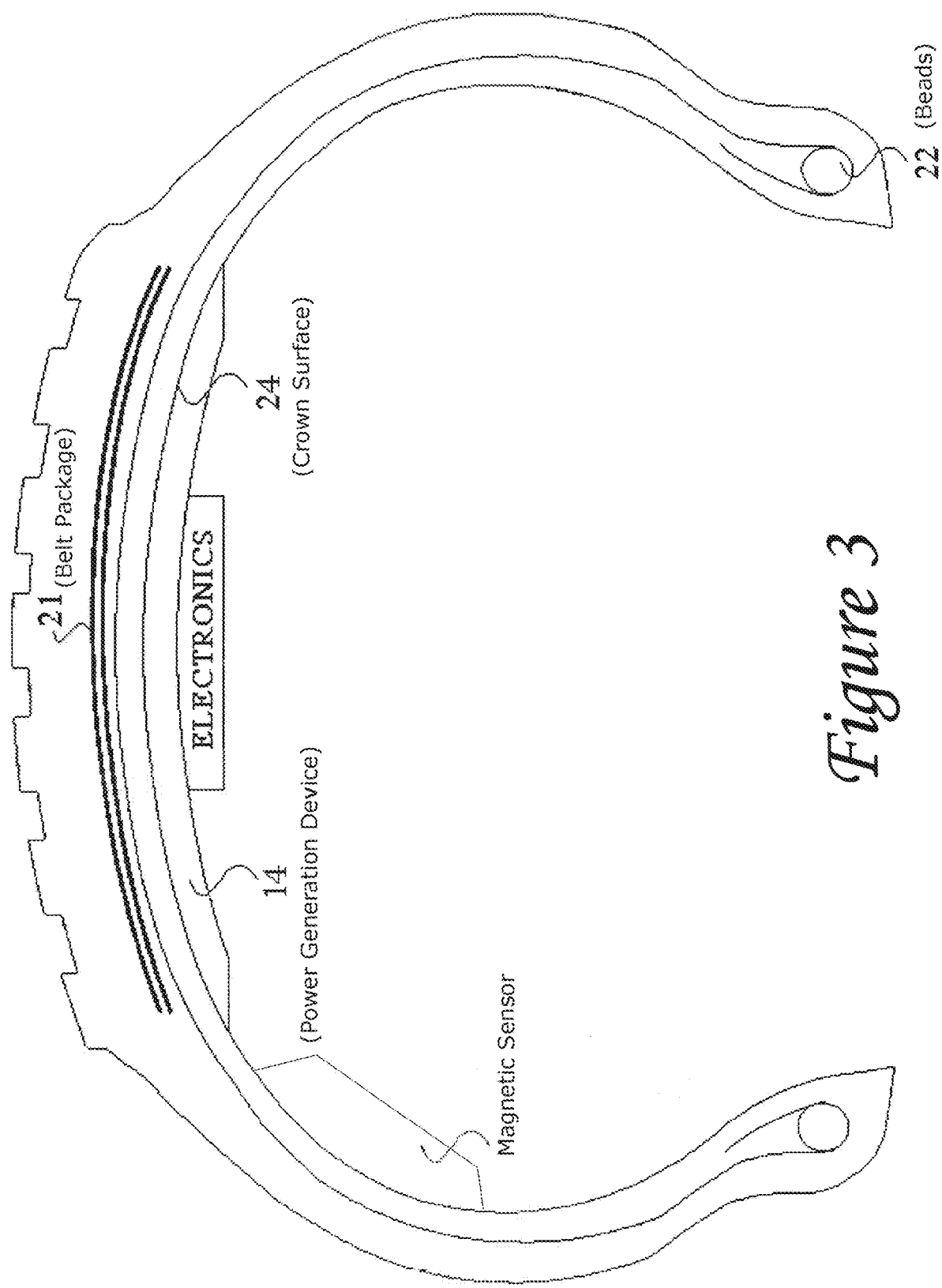
FIG. 3 illustrates one embodiment of a magnetic sensor system that includes a piezoelectric power generating component positioned inside a tire, thus facilitating retrofitting of existing vehicles to render them AV vehicle suitable, thus providing a way for an AV system to be adopted to achieve the life saving and gas saving potential in such an AV system.

FIG. 3 illustrates one embodiment of a magnetic sensor system that includes a piezoelectric power generating component positioned inside a tire, thus facilitating retrofitting of existing vehicles to render them AV vehicle suitable, thus providing a way for an AV system to be adopted to achieve the life saving and gas saving potential in such an AV system.

Figure 4:
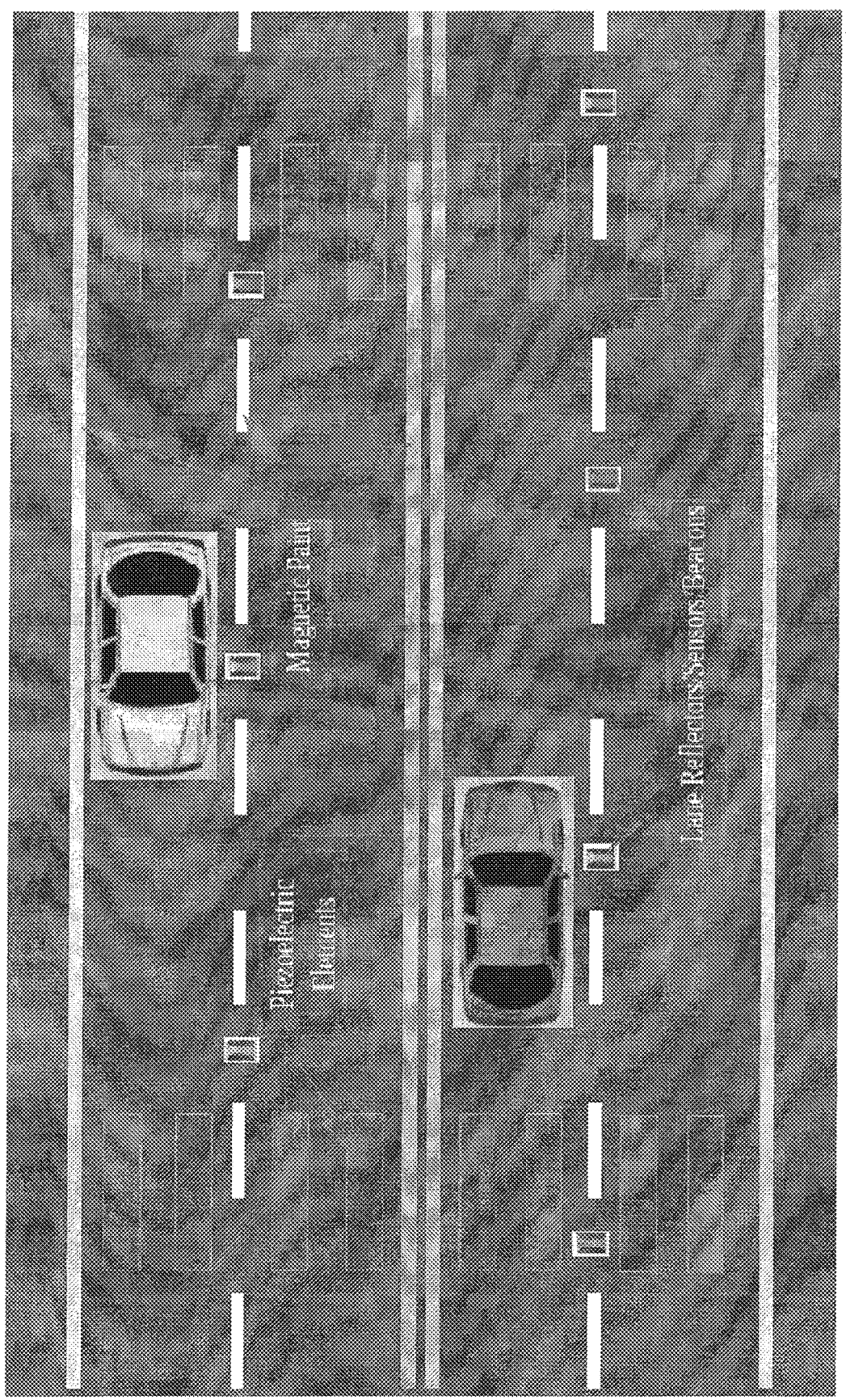
FIG. 4 depicts how sensors and beacons may be positioned on or in existing structures such as light poles, mile markers, road signage, roadway reflectors, roadway paint, marking material, lane dividers, temporary traffic markers, and beneath roadway surfaces.

FIG. 4 illustrates how one or more sensors and beacons may be positioned on or in existing structures such as light poles, mile markers, road signage, roadway reflectors, roadway paint, marking material, lane dividers, temporary traffic markers, and beneath roadway surfaces. Sensor and beacon functionality is based on at least one, but may include multiple technologies, including magnetic, RF, visual, infrared, ultraviolet, subsonic, ultrasonic, mechanical, gamma radiation, and short-range radio frequency communication methods.

Figure 5:
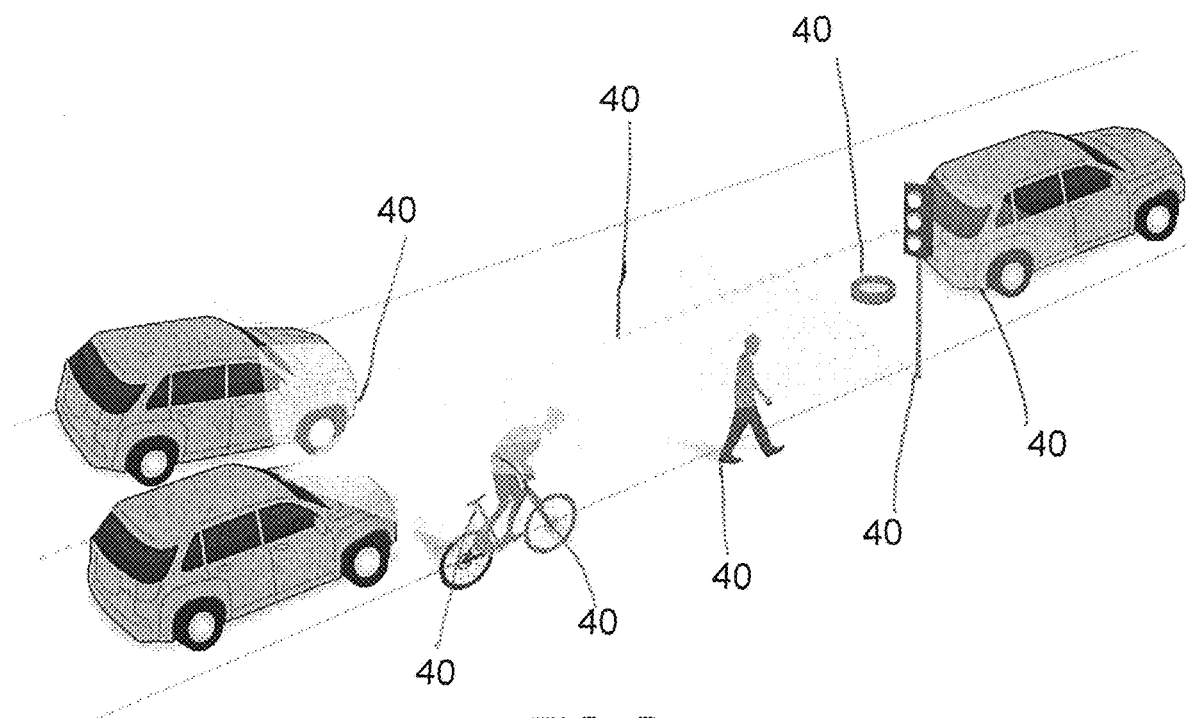
FIG. 5 illustrates other aspects of certain embodiments of the present invention, namely the provision of "recognition features" 40 to enable AV's to "see" various structures.

FIG. 5 illustrates other aspects of certain embodiments of the present invention, namely the provision of "recognition features" 40 to enable AV's to "see" various structures, apparel, animals, etc., such that sensors and beacons may be placed on or in existing structures such as light poles, clothing, shoes, tags, bikes, mile markers, road signage, roadway reflectors, roadway paint or marking material, lane dividers, temporary traffic markers, etc.

Figure 6:
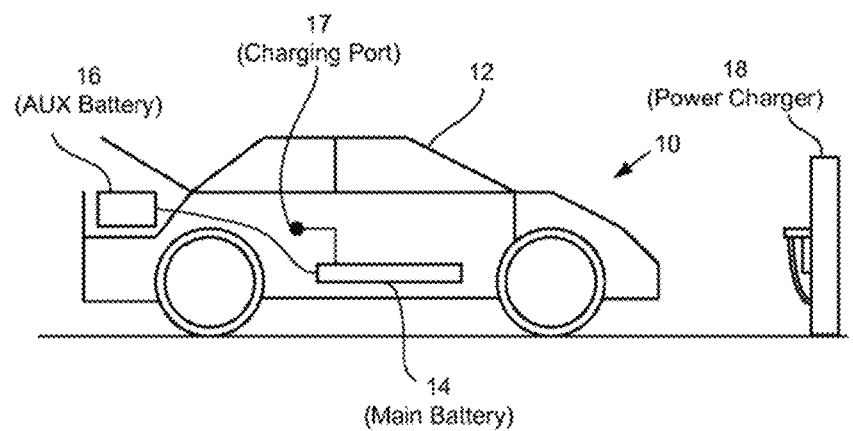
FIG. 6 shows vehicle 10 illustrated with a charging port 17 that couples to main battery 14. Charging port 17 will enable standardized charging of vehicle 10 at designated charging stations, such as power charger 18. Power charger 18 can be installed at the vehicles home base, or can be installed at various locations designated for charging for a fee.

As shown in FIG. 6, the charging port 17 will typically be the charging outlet on the vehicle that will receive a connector that couples to power. For example, in a home configuration, the receptacle can be provided with a connection to the power grid of the home. The receptacle is then connected to the charging port 17 of the vehicle when charging of the vehicles main battery 14 is desired.

Figure 7:
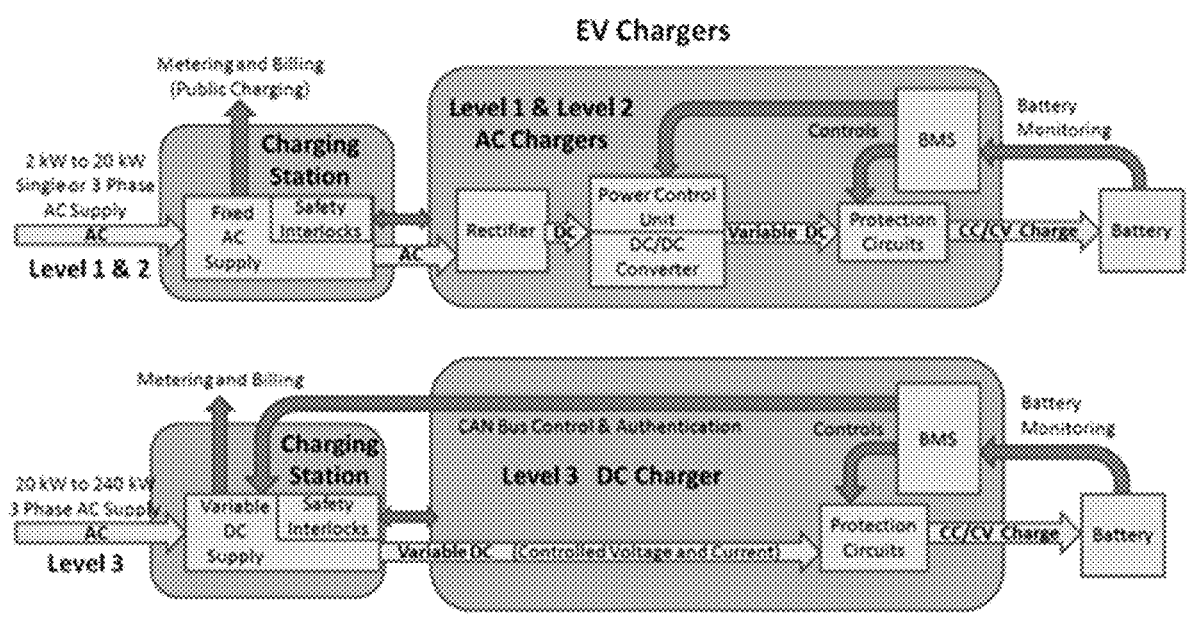
FIG. 7 illustrates electric vehicle charging components that operate according to a variety of standards specifying requirements for conductive AC and DC charging, connection, communication and safety used in equipment that provides electric charging in and to electric vehicles.

FIG. 7 illustrates electric vehicle charging components that operate according to a variety of standards specifying requirements for conductive AC and DC charging, connection, communication and safety used in equipment that provides electric charging in and to electric vehicles.

In still other embodiments, pavement marking materials may further include encoded information, much like smartcards employ, that include one or more bits of information. An AV on-board sensing system acquires the information when the vehicle passes by the reference markers and thereby determines vehicle position, preferably used in combination with other systems that include optical sensing, radar, and acoustic or video sensing systems. Various embodiments are designed to sense the vehicle's position relative to a desired pathway, usually the center line of the highway.

The present invention has now been described with reference to several embodiments thereof. The foregoing detailed description and examples have been given for clarity of understanding only. No unnecessary limitations are to be understood therefrom. All patents and patent applications cited herein are hereby incorporated by reference. It will be apparent to those skilled in the art that many changes can be made in the embodiments described without departing from the scope of the invention. Thus, the scope of the present invention should not be limited to the exact details and structures described herein, but rather by the structures described by the language of the claims, and the equivalents of those structures.

What is claimed is:

1. A driving assistance system, comprising:
a plurality of magnetic markers that each include a magnet component configured to generate a magnetic field on a road surface, said magnetic markers comprising a magnetic tape or magnetic sheet, and wherein the magnet component is one of a conformable and a non-conformable magnet selected from the group consisting of polymeric magnets, ceramic magnets, metal magnets and metal alloy magnets; and
a pavement marking material that includes a RFID tag that is readable by a RFID tag reader, said pavement marking material including encoded information that includes one or more bits of information able to be conveyed to a vehicle's on-board sensing system comprising a sensor system adapted to obtain data through wireless communications, and wherein the RFID tag is mounted on or within a body of the pavement marking material.

2. The driving assistance system of claim 1, wherein the plurality of magnetic markers comprise magnet components that are conformable and comprise polymeric materials that have viscoelastic properties.

3. The driving assistance system of claim 1, wherein the magnetic component comprises magnetic particles embedded in a conformable magnetic layer selected from the group consisting of paint and a polymeric composite stripe adherable to the road surface.

4. The driving assistance system of claim 1, wherein the magnet component comprises a polymeric magnet that includes magnetic particles.

5. The driving assistance system of claim 1, wherein the vehicle is configured to detect said pavement marking materials, despite weather conditions.

6. The driving assistance system of claim 1, wherein the vehicle has a magnetic sensor adapted to detect a magnetic signal, said magnetic sensor positioned on the vehicle to detect magnetic fields from said plurality of magnetic markers when positioned on said road surface.

7. The driving assistance system of claim 6, wherein the plurality of magnetic markers are about 12-18 inches away from the magnetic sensor when the vehicle is in a closest proximity to the plurality of magnetic markers.

8. The driving assistance system of claim 1, wherein said pavement marking material is adapted to reflect at least two of the following signals: visible light, laser from a lidar; and a radar signal.

9. The driving assistance system of claim 1, wherein said plurality of magnetic markers present a magnetic signal and are adapted to be positioned on one of a lane edge of a vehicle lane on the roadway, and in the center of the roadway.

10. The driving assistance system of claim 1, wherein said plurality of magnetic markers include one or more rare earth magnetic components.

11. The driving assistance system of claim 1, wherein said system enables accurate lane marking recognition despite weather conditions where the road is covered by snow.

12. The driving assistance system of claim 1, wherein at least one of said RFID tag reader and said vehicle's on-board sensing system comprises a magnetic sensor powered by at least one piezoelectric power generation system.

13. The driving assistance system of claim 1, wherein said RFID tag is embedded in said pavement marking material.

14. The driving assistance system of claim 1, wherein said pavement marking material includes a thin-film conductive material that conducts one of an AC or DC current.

15. The driving assistance system of claim 1, wherein said plurality of magnetic markers comprise neodymium magnets having a diameter of at least about 20 mm in diameter and are at least about 5 mm thick.

16. The driving assistance system of claim 1, further comprising infusing power to said plurality of magnetic markers by solar charged batteries embedded in said plurality of magnetic markers.

17. The driving assistance system of claim 1, wherein said plurality of magnetic markers comprise polymeric materials having viscoelastic properties with magnetic particles embedded in said polymeric materials.

18. A driving assistance system, comprising:
a plurality of magnetic markers that each include a magnet component configured to generate a magnetic field on a road surface, said magnetic markers comprising a magnetic tape or magnetic sheet, and wherein the magnet component is one of a conformable and a non-conformable magnet selected from the group consisting of polymeric magnets, ceramic magnets, metal magnets and metal alloy magnets;

a pavement marking material that includes a RFID tag that is readable by a RFID tag reader, said pavement marking material including encoded information that includes one or more bits of information able to be conveyed to a vehicle's on-board sensing system comprising a sensor system adapted to obtain data through wireless communications, and wherein the RFID tag is mounted on or within a body of the pavement marking material; wherein a rare earth magnet is embedded in said pavement marking material; wherein a magnetic field of said plurality of magnetic markers, measured at 12 inches, is greater than at least 2 gauss; and wherein the magnet component is disposed in the plurality of magnetic markers, said plurality of magnetic markers being arranged in an array in which a gap of predetermined distance is maintained.

19. The driving assistance system of claim 1, wherein the vehicle is configured to detect said pavement marking materials, despite weather conditions.

20. A driving assistance system, comprising:

a plurality of magnetic markers that each include a magnet component configured to generate a magnetic field on a road surface, said magnetic markers comprising a magnetic tape or magnetic sheet, and wherein the magnet component is one of a conformable and a non-conformable magnet selected from the group consisting of polymeric magnets, ceramic magnets, metal magnets and metal alloy magnets;

a pavement marking material that includes a RFID tag that is readable by a RFID tag reader, said pavement marking material including encoded information that includes one or more bits of information able to be conveyed to a vehicle's on-board sensing system comprising a sensor system adapted to obtain data through wireless communications, and wherein the RFID tag is mounted on or within a body of the pavement marking material; wherein the magnetic component comprises magnetic particles embedded in a conformable magnetic layer selected from the group consisting of paint and a polymeric composite stripe adherable to the road surface; and wherein said system enables accurate lane marking recognition despite weather conditions where the road is covered by snow.

\* \* \* \* \*